US011844097B2

(12) United States Patent
Taherzadeh Boroujeni et al.

(10) Patent No.: US 11,844,097 B2
(45) Date of Patent: Dec. 12, 2023

(54) TECHNIQUES FOR DETERMINING PHASE TRACKING REFERENCE SIGNAL LOCATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US); Jing Sun, San Diego, CA (US); Junyi Li, Franklin Park, NJ (US); Juan Montojo, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 17/222,753

(22) Filed: Apr. 5, 2021

(65) Prior Publication Data

US 2022/0322332 A1   Oct. 6, 2022

(51) Int. Cl.
*H04L 5/00*       (2006.01)
*H04W 72/0446*    (2023.01)
*H04W 72/23*      (2023.01)
*H04W 72/51*      (2023.01)

(52) U.S. Cl.
CPC .......... *H04W 72/51* (2023.01); *H04L 5/0051* (2013.01); *H04W 72/0446* (2013.01); *H04W 72/23* (2023.01)

(58) Field of Classification Search
CPC .......... H04W 72/0446; H04W 72/048; H04W 72/1289; H04L 5/0051
See application file for complete search history.

(56) References Cited

U.S. PATENT DOCUMENTS

| | | | |
|---|---|---|---|
| 2019/0254020 A1* | 8/2019 | Nam | H04W 72/0413 |
| 2020/0022172 A1* | 1/2020 | Sun | H04L 1/0003 |
| 2021/0014095 A1 | 1/2021 | Ly et al. | |
| 2021/0329685 A1* | 10/2021 | Matsumura | H04L 5/0094 |
| 2022/0271886 A1* | 8/2022 | He | H04L 5/0082 |

FOREIGN PATENT DOCUMENTS

| | | |
|---|---|---|
| EP | 3459201 A1 | 3/2019 |
| WO | WO-2019051085 A1 | 3/2019 |

OTHER PUBLICATIONS

5G; NR; Physical channels and modulation, 3GPP ETSI TS 38.211 version 16.2.0 Release 16, Jul. 2020 (Year: 2020).*
International Search Report and Written Opinion—PCT/US2022/019616—ISA/EPO—dated Jun. 3, 2022 (2103297WO).

* cited by examiner

*Primary Examiner* — Brian P Cox
(74) *Attorney, Agent, or Firm* — Dalei Dong; Holland & Hart LLP

(57) ABSTRACT

Methods, systems, and devices for wireless communication at a user equipment (UE) are described. A UE may receive, from a base station, a control message including an indication of a reference signal configuration associated with one or more physical channels scheduled during a set of time intervals. The UE may identify that demodulation reference signal is absent in a first time interval. In some examples, the UE may determine, based on the control message, a location for transmitting a phase tracking reference signal in the first time interval of the set of time intervals. The UE may then transmit the phase tracking reference signal in the first time interval at the determined location.

30 Claims, 17 Drawing Sheets

TECHNIQUES FOR DETERMINING PHASE TRACKING REFERENCE SIGNAL LOCATION

FIELD OF DISCLOSURE

The following relates to wireless communication at a user equipment (UE), including techniques for determining phase tracking reference signal location.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems (e.g., New Radio (NR) systems), may support high throughput and low latency communications. Some techniques for feedback in systems supporting high throughput and low latency communications, however, may be deficient in some implementations.

SUMMARY

The present disclosure relate to improved methods, systems, devices, and apparatuses that support techniques for determining phase tracking reference signal location. Generally, the present disclosure provide for support determining location for phase-tracking reference signal transmission, such as for fifth generation (5G) New Radio (NR) systems. In some examples, the present disclosure may include configuring the UE to determine that one or multiple time and frequency resources for transmitting a phase-tracking reference signal on a scheduled physical uplink shared channel or physical downlink shared channel. The UE may be configured to determine that demodulation reference signal is absent in a time interval including the scheduled physical uplink shared channel or physical downlink shared channel. The UE may use techniques to determine location for transmitting a phase tracking reference signal in the time interval of a set of time intervals. In some examples, the UE may determine the location based on a control message received from a base station. The UE may then transmit the phase tracking reference signal in the time interval at the determined location. The present disclosure may, as a result, include features for improvements to UE operations and, in some examples, may promote high reliability and low latency transmissions, among other benefits.

A method for wireless communication at a user equipment (UE) is described. The method may include receiving, from a base station, a control message including an indication of a reference signal configuration associated with one or more physical channels scheduled during a set of multiple time intervals, determining, based on the control message, a location for transmitting a phase tracking reference signal in a first time interval of the set of multiple time intervals, where a demodulation reference signal is absent in the first time interval, and transmitting, to the base station, the phase tracking reference signal in the first time interval at the determined location.

An apparatus for wireless communication at a UE is described. The apparatus may include a processor, memory coupled with the processor, and instructions stored in the memory. The instructions may be executable by the processor to cause the apparatus to receive, from a base station, a control message including an indication of a reference signal configuration associated with one or more physical channels scheduled during a set of multiple time intervals, determine, based on the control message, a location for transmitting a phase tracking reference signal in a first time interval of the set of multiple time intervals, where a demodulation reference signal is absent in the first time interval, and transmit, to the base station, the phase tracking reference signal in the first time interval at the determined location.

Another apparatus for wireless communication at a UE is described. The apparatus may include means for receiving, from a base station, a control message including an indication of a reference signal configuration associated with one or more physical channels scheduled during a set of multiple time intervals, means for determining, based on the control message, a location for transmitting a phase tracking reference signal in a first time interval of the set of multiple time intervals, where a demodulation reference signal is absent in the first time interval, and means for transmitting, to the base station, the phase tracking reference signal in the first time interval at the determined location.

A non-transitory computer-readable medium storing code for wireless communication at a UE is described. The code may include instructions executable by a processor to receive, from a base station, a control message including an indication of a reference signal configuration associated with one or more physical channels scheduled during a set of multiple time intervals, determine, based on the control message, a location for transmitting a phase tracking reference signal in a first time interval of the set of multiple time intervals, where a demodulation reference signal is absent in the first time interval, and transmit, to the base station, the phase tracking reference signal in the first time interval at the determined location.

Some examples of the method, apparatuses, and non-transitory computer-readable medium described herein may further include operations, features, means, or instructions for identifying that the control message indicates that demodulation reference signal bundling may be activated for the set of multiple time intervals, where a second time interval preceding the first time interval and a third time interval succeeding the first time interval include the demodulation reference signal.

Some examples of the method, apparatuses, and non-transitory computer-readable medium described herein may further include operations, features, means, or instructions for identifying a time domain resource allocation indicated via the control message and identifying a symbol at a beginning of the first time interval of the set of multiple time intervals based on the time domain resource allocation, where the location for transmitting the phase tracking reference signal in the first time interval includes the symbol at the beginning of the first time interval.

Some examples of the method, apparatuses, and non-transitory computer-readable medium described herein may further include operations, features, means, or instructions for identifying a first symbol within the first time interval of the set of multiple time intervals and applying a shift in time to the first symbol to identify a second symbol within the first time interval, where the location for transmitting the phase tracking reference signal in the first time interval includes the second symbol within the first time interval.

In some examples of the method, apparatuses, and non-transitory computer-readable medium described herein, determining the location for transmitting the phase tracking reference signal in the first time interval may include operations, features, means, or instructions for determining a location of a resource element including the demodulation reference signal in a second time interval preceding the first time interval of the set of multiple time intervals, where the location for transmitting the phase tracking reference signal in the first time interval may be based on the location of the resource element including the demodulation reference signal in the second time interval.

In some examples of the method, apparatuses, and non-transitory computer-readable medium described herein, determining the location for transmitting the phase tracking reference signal in the first time interval may include operations, features, means, or instructions for determining a location of a resource element associated with an eliminated demodulation reference signal in the first time interval of the set of multiple time intervals, where the location for transmitting the phase tracking reference signal in the first time interval may be based on the location of the resource element associated with the eliminated demodulation reference signal.

Some examples of the method, apparatuses, and non-transitory computer-readable medium described herein may further include operations, features, means, or instructions for receiving, from the base station, a configuration message including a first configuration and a second configuration for counting one or more symbols for transmitting the phase tracking reference signal.

In some examples of the method, apparatuses, and non-transitory computer-readable medium described herein, receiving the control message may include operations, features, means, or instructions for receiving, from the base station, the control message selecting the first configuration or the second configuration for counting the one or more symbols for transmitting the phase tracking reference signal, where the location for transmitting the phase tracking reference signal may be based on the selected configuration. In some examples of the method, apparatuses, and non-transitory computer-readable medium described herein, the first configuration and the second configuration include a subset of a set of multiple configurations.

Some examples of the method, apparatuses, and non-transitory computer-readable medium described herein may further include operations, features, means, or instructions for receiving a radio resource control signal including a configuration for a set of multiple time densities associated with the phase tracking reference signal and identifying a time density from the set of multiple time densities based on the received configuration, where transmitting the phase tracking reference signal includes transmitting the phase tracking reference signal according to the identified time density.

In some examples of the method, apparatuses, and non-transitory computer-readable medium described herein, transmitting the phase tracking reference signal may include operations, features, means, or instructions for transmitting the phase tracking reference signal on a first set of resource elements with a first time density and on a second set of resource elements with a second time density, the first time density being greater than the second time density.

In some examples of the method, apparatuses, and non-transitory computer-readable medium described herein, the first set of resource elements may be located at an edge of the first time interval. In some examples of the method, apparatuses, and non-transitory computer-readable medium described herein, the control message includes a downlink control indicator. In some examples of the method, apparatuses, and non-transitory computer-readable medium described herein, the one or more physical channels include a physical uplink shared channel or a physical downlink shared channel or both.

A method for wireless communication at a base station is described. The method may include transmitting, to a UE, a control message including an indication of a reference signal configuration associated with one or more physical channels scheduled during a set of multiple time intervals and receiving, from the UE and based on the control message, a phase tracking reference signal at a location in a first time interval of the set of multiple time intervals, where a demodulation reference signal is absent in the first time interval.

An apparatus for wireless communication at a base station is described. The apparatus may include a processor, memory coupled with the processor, and instructions stored in the memory. The instructions may be executable by the processor to cause the apparatus to transmit, to a UE, a control message including an indication of a reference signal configuration associated with one or more physical channels scheduled during a set of multiple time intervals and receive, from the UE and based on the control message, a phase tracking reference signal at a location in a first time interval of the set of multiple time intervals, where a demodulation reference signal is absent in the first time interval.

Another apparatus for wireless communication at a base station is described. The apparatus may include means for transmitting, to a UE, a control message including an indication of a reference signal configuration associated with one or more physical channels scheduled during a set of multiple time intervals and means for receiving, from the UE and based on the control message, a phase tracking reference signal at a location in a first time interval of the set of multiple time intervals, where a demodulation reference signal is absent in the first time interval.

A non-transitory computer-readable medium storing code for wireless communication at a base station is described. The code may include instructions executable by a processor to transmit, to a UE, a control message including an indication of a reference signal configuration associated with one or more physical channels scheduled during a set of multiple time intervals and receive, from the UE and based on the control message, a phase tracking reference signal at a location in a first time interval of the set of multiple time intervals, where a demodulation reference signal is absent in the first time interval.

In some examples of the method, apparatuses, and non-transitory computer-readable medium described herein, transmitting the control message may include operations, features, means, or instructions for transmitting the control message indicating that demodulation reference signal bundling may be activated for the set of multiple time intervals, where a second time interval preceding the first time interval and a third time interval succeeding the first time interval include the demodulation reference signal.

Some examples of the method, apparatuses, and non-transitory computer-readable medium described herein may further include operations, features, means, or instructions for indicating a time domain resource allocation via the control message, where the location of the phase tracking reference signal in the first time interval includes a symbol at a beginning of the first time interval of the set of multiple time intervals.

Some examples of the method, apparatuses, and non-transitory computer-readable medium described herein may further include operations, features, means, or instructions for identifying a first symbol within the first time interval of the set of multiple time intervals and configuring the UE to apply a shift in time to the first symbol to identify a second symbol within the first time interval, where the location of the phase tracking reference signal in the first time interval includes the second symbol within the first time interval.

In some examples of the method, apparatuses, and non-transitory computer-readable medium described herein, the location of the phase tracking reference signal in the first time interval may be based on a location of a resource element including the demodulation reference signal in a second time interval preceding the first time interval of the set of multiple time intervals.

In some examples of the method, apparatuses, and non-transitory computer-readable medium described herein, the location of the phase tracking reference signal in the first time interval may be based on a location of a resource element associated with an eliminated demodulation reference signal in the first time interval of the set of multiple time intervals.

Some examples of the method, apparatuses, and non-transitory computer-readable medium described herein may further include operations, features, means, or instructions for transmitting, to the UE, a configuration message including a first configuration and a second configuration for counting one or more symbols for transmitting the phase tracking reference signal. In some examples of the method, apparatuses, and non-transitory computer-readable medium described herein, transmitting the control message may include operations, features, means, or instructions for transmitting, to the UE, the control message selecting the first configuration or the second configuration for counting the one or more symbols for transmitting the phase tracking reference signal, where the location of the phase tracking reference signal may be based on the selected configuration. In some examples of the method, apparatuses, and non-transitory computer-readable medium described herein, the first configuration and the second configuration include a subset of a set of multiple configurations.

Some examples of the method, apparatuses, and non-transitory computer-readable medium described herein may further include operations, features, means, or instructions for transmitting a radio resource control signal including a configuration for a set of multiple time densities associated with the phase tracking reference signal, where receiving the phase tracking reference signal includes receiving the phase tracking reference signal according to a time density from the set of multiple time densities identified based on the received configuration.

In some examples of the method, apparatuses, and non-transitory computer-readable medium described herein, receiving the phase tracking reference signal may include operations, features, means, or instructions for receiving the phase tracking reference signal on a first set of resource elements with a first time density and on a second set of resource elements with a second time density, the first time density being greater than the second time density. In some examples of the method, apparatuses, and non-transitory computer-readable medium described herein, the first set of resource elements may be located at an edge of the first time interval.

DETAILED DESCRIPTION

Figure 1:
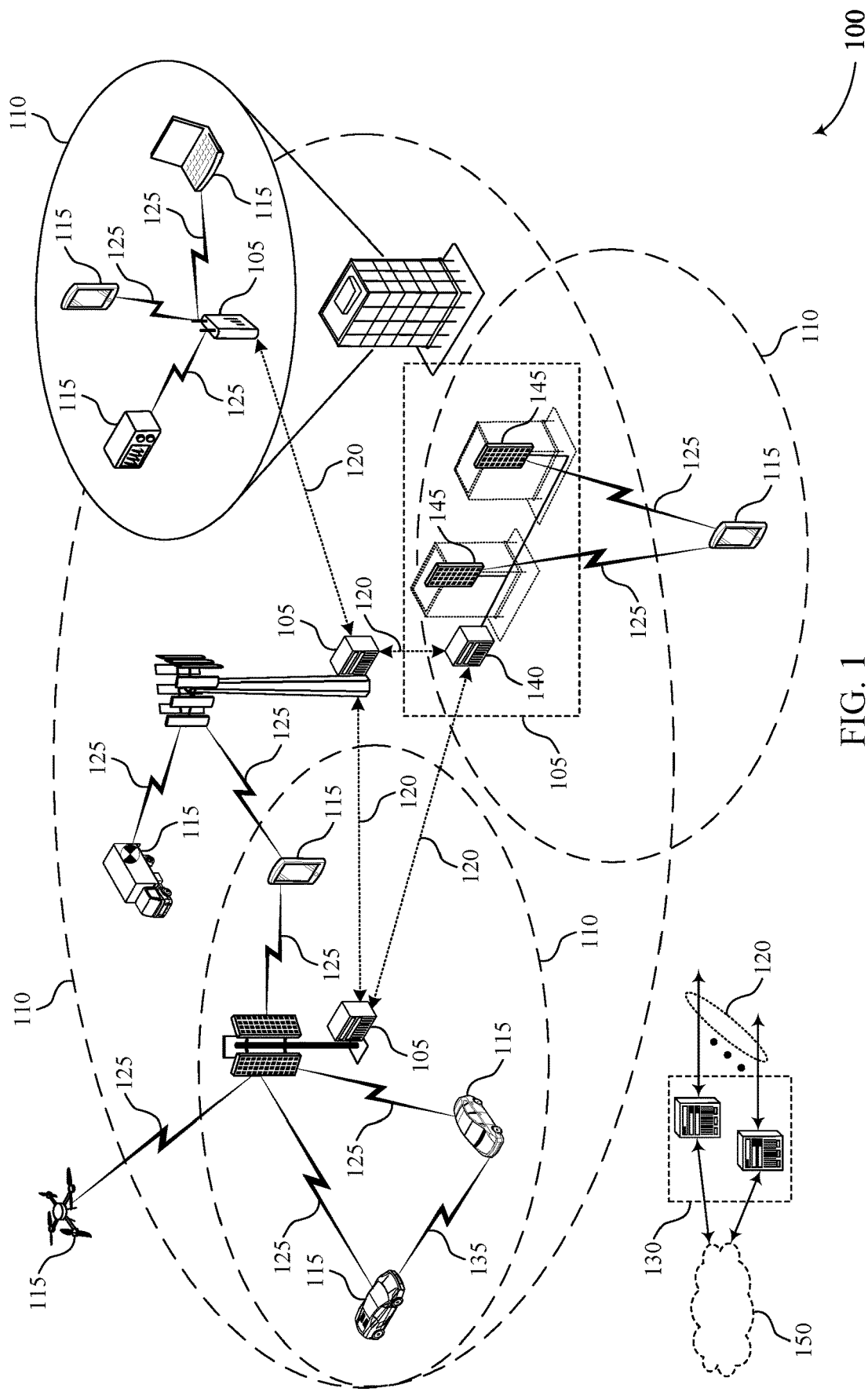
FIG. 1 illustrates an example of a wireless communications system that supports techniques for determining phase tracking reference signal location in accordance with various aspects of the present disclosure.

Some wireless communication systems may include communication devices, such as user equipments (UEs) and base stations, for example, next-generation NodeBs or giga-NodeBs (either of which may be referred to as a gNB) that may support multiple radio access technologies including fifth generation (5G) systems, which may be referred to as New Radio (NR) systems, among others. Some wireless communication systems may experience relatively high levels of data traffic due to an increase in demand for a wide range of broadband applications and services by the communication devices. In some wireless communications systems, a base station may transmit one or more reference signals to aid a user equipment (UE) in demodulating and decoding transmissions. One such reference signal may be a phase tracking reference signal that may be used at a UE to compensate for oscillator phase noise. In particular, phase tracking reference signals are transmitted by a base station to a UE to allow the UE to track phase of the local oscillator.

Communication devices may be scheduled to transmit or receive data traffic on multiple data channels including physical downlink shared channels and physical uplink shared channels. Wireless communications systems may also provide for demodulation reference signal bundling where a first time interval may include demodulation reference signal, a second time interval following the first time interval may not include demodulation reference signal and a third time interval following the second time interval may include a copy of the demodulation reference signal. In some examples, UEs may be configured to determine a location for transmitting phase tracking reference signal based on a location of demodulation reference signal in a data channels including physical downlink shared channel or physical uplink shared channel. Aspects depicted herein provides for a UE may to determine a location for transmitting the phase tracking reference signal in the absence of demodulation reference signal in a time interval.

To determine a location for transmitting a phase tracking reference signal in time intervals where demodulation reference signal is absent, a UE may receive a control message including a demodulation reference signal configuration for upcoming time intervals. In particular, the control message may include an indication of a reference signal configuration associated with one or more physical channels scheduled during a set of time intervals. The UE may then determine that a first time interval does not include demodulation reference signal. The UE may determine a location for transmitting a phase tracking reference signal in the first time interval. In some examples, the UE may determine the location of phase tracking reference signal as the beginning of the first time interval. The UE may also use the beginning of the first time interval as the basis for symbol counting and location of symbols for transmitting phase tracking reference signal. In another example, the location of phase tracking reference signal in the first time interval may be based on the location of demodulation reference signal on a previous physical uplink shared channel (or physical downlink shared channel copy) or a location of eliminated demodulation reference signal resource elements in the first time interval.

Particular aspects of the subject matter described in this disclosure may be implemented to realize one or more of the following potential improvements, among others. The techniques employed by the UE may provide benefits and enhancements to the operation of the UE. For example, by transmitting phase tracking reference signal in a determined location, phase noise compensation may be enhanced, which may improve communications reliability for the UE and base station. In some examples, operations performed by the UE may support techniques for determining phase tracking reference signal location, among other examples in wireless communications systems, may support improvements in power consumption, resource usage, coverage enhancements, spectral efficiency, higher data rates, among other benefits.

he following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Aspects of the disclosure are initially described in the context of wireless communications systems. Aspects of the disclosure are further described in the context of resource grids and process flows. Aspects of the disclosure are further illustrated by and described with reference to apparatus diagrams, system diagrams, and flowcharts that relate to techniques for determining phase tracking reference signal location.

FIG. 1 illustrates an example of a wireless communications system 100 that supports techniques for determining phase tracking reference signal location in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to one or more aspects of the present disclosure, a UE 115 may receive, from a base station 105, a control message including an indication of a reference signal configuration associated with one or more physical channels scheduled during a set of time intervals. The UE 115 may determine, based on the control message, a location for transmitting a phase tracking reference signal in a first time interval of the set of time intervals. In some examples, a demodulation reference signal may be absent in the first time interval. The UE 115 may then transmitting, to the base station, the phase tracking reference signal in the first time interval at the determined location.

Figure 2:
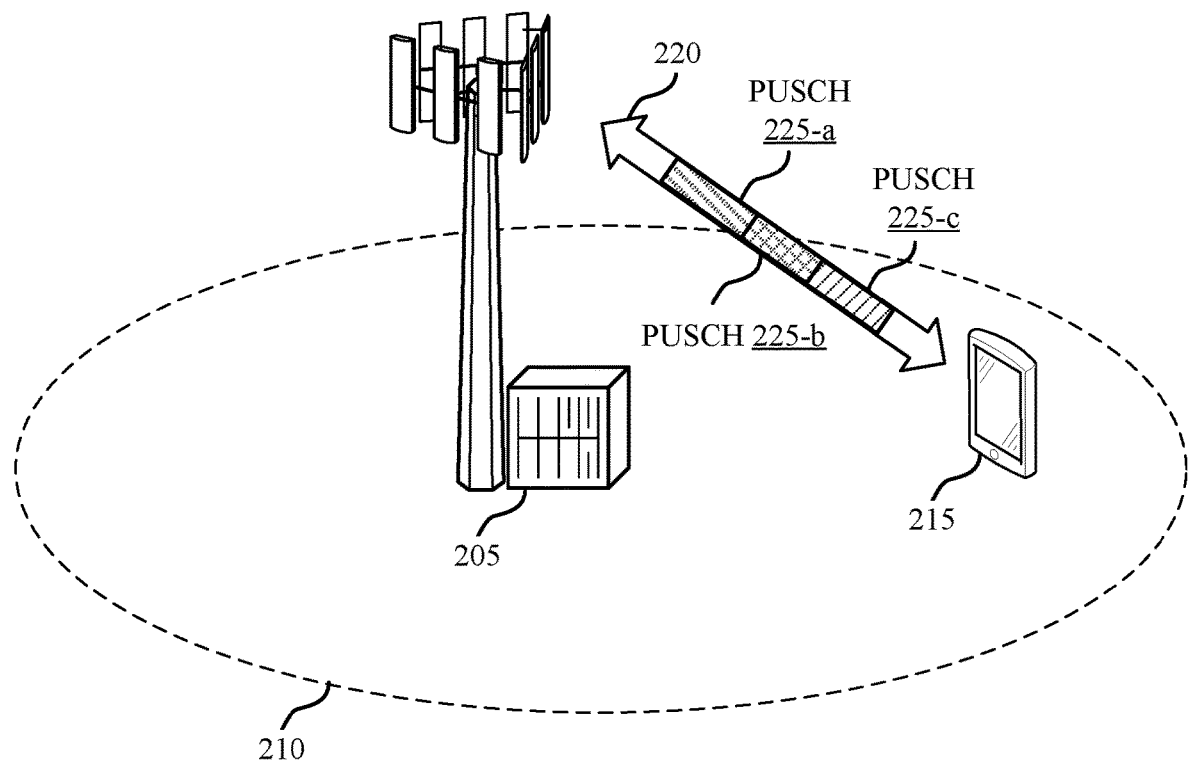
FIG. 2 illustrates an example of a wireless communications system that supports techniques for determining phase tracking reference signal location in accordance with various aspects of the present disclosure.

FIG. 2 illustrates an example of a wireless communications system 200 that supports techniques for determining phase tracking reference signal location in accordance with various aspects of the present disclosure. The wireless communications system 200 may implement aspects of the wireless communications system 100. For example, the wireless communications system 200 may include a base station 205 and a UE 215 within a geographic coverage area 210. The base station 205 and the UE 215 may be examples of a base station 105 and a UE 115 as described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote high reliability and low latency in phase tracking reference signal transmissions, among other benefits.

The base station 205 and the UE 215 may be configured with multiple antennas, which may be used to employ techniques such as transmit diversity, receive diversity, multiple-input multiple-output communications, or beamforming. The antennas of the base station 205 and the UE 215 may be located within one or more antenna arrays or antenna panels, which may support multiple-input multiple-output operations or transmit or receive beamforming. For example, the base station 205 antennas or antenna arrays may be co-located at an antenna assembly, such as an antenna tower. In some examples, antennas or antenna arrays associated with the base station 205 may be located in diverse geographic locations. The base station 205 may have an antenna array with a number of rows and columns of antenna ports that the base station 205 may use to support beamforming of communications with the UE 215. Likewise, the UE 215 may have one or more antenna arrays that may support various multiple-input multiple-output or beamforming operations. Additionally or alternatively, an antenna panel may support radio frequency beamforming for a signal transmitted via one or more antenna ports.

The base station 205 and the UE 215 may thus be configured to support directional communications 220 (e.g., beamformed communications) using the multiple antennas. The base station 205 and the UE 215 may communicate via the directional communications 220. In some examples, the base station 205 and the UE 215 may be configured to support multiple downlink component carriers and multiple uplink component carriers. The base station 205 and the UE 215 may be configured to support the directional communications 220 over a carrier bandwidth or may be configured to support the directional communications 220 over one of multiple carrier bandwidths. The base station 205 and the UE 215 may communicate via a downlink communication link and an uplink communication link. In some implementations, the base station 205 may configure the UE 215 for communications, with at least a portion of the configuration provided by a configuration message. The configuration message may provide information related to a set of frequency resources that are configured for communications, such as a number of frequency sub-bands that are configured in one or more carriers used in downlink communication link and uplink communication link. In some implementations, the base station 205 may configure multiple component carriers that carry communications between the UE 215 and the base station 205.

In some wireless communications systems (e.g., NR wireless systems, such as wireless communications system 200), the UE 115 a and the base station 105 a may support low latency and high throughput communications. UEs 115 and base stations 105 in wireless communications systems may communicate according to one or more time periods (e.g., frame, half-frame, subframe, slot, sub-slot, symbol, etc.).

Phase tracking reference signals are transmitted by a base station to a UE to allow the UE to track a phase of a local oscillator. In some examples, phase tracking reference signals may enable suppression of phase noise and common phase error, especially at higher mmW frequencies. Additionally or alternatively, phase tracking reference signals may be used by the base station 205 for phase tracking purposes. Some wireless communications systems provide for phase tracking reference signals to be transmitted at locations that are calculated with respect to demodulation reference symbols within a time interval (e.g., time slot). Additionally or alternatively, time densities in some wireless communications systems provide for a phase tracking reference signal in every physical downlink shared channel symbol, per every two physical downlink shared channel symbols, or per every four physical downlink shared channel symbols (calculated with reference to the demodulation reference signal symbols within a time slot). In some examples, wireless communications systems may also provide for demodulation reference signal bundling, where a first time interval may include demodulation reference signal, a second time interval following the first time interval may not include demodulation reference signal and a third time interval following the second time interval may include a copy of the demodulation reference signal. Techniques depicted herein provide for a UE (e.g., UE 215) to determine a location for transmitting the phase tracking reference signal in the absence of demodulation reference signal in a time interval.

According to one or more aspects of the present disclosure, the UE 215, in the wireless communications system 200, may support operations to preserve resources (e.g., time and frequency resources of the wireless communications system 200) or a battery life of the UE 215, among other examples. In some examples, the UE 115-b may be configured to support operations to manage or improve the directional communications 220 between the base station 205 and the UE 215. For example, the base station 105 may configure the UE 115 to determine a location for transmitting phase tracking reference signals over data channels (e.g., physical uplink shared channel or physical downlink shared channel) in the wireless communications system 200.

In some examples, a capability of the UE 215 may indicate whether the UE 215 supports physical uplink shared channel demodulation reference signal bundling. Additionally or alternatively, the physical uplink shared channel demodulation reference signal bundling may depend on a phase continuity maintenance at the UE 215. In some examples, an ability of UE 215 to maintain phase continuity may depend on whether the physical uplink shared channel transmission (or physical uplink control channel transmission) is contiguous. In some examples, the ability of UE 215 to maintain phase continuity may depend on a gap between time intervals (in terms of the length or usage). In some instances, the base station 205 may estimate possible phase jump using phase tracking reference signals.

Phase tracking reference signals may be embedded into the physical downlink shared channel or the physical uplink shared channel (using cyclic prefix orthogonal frequency division multiplexing (CP-OFDM) and DFT-S-OFDM) resource allocation. In some examples, phase tracking reference signals may be active when data channels are active for the given UE. In some instances, up to 2 ports may be configurable for downlink and up to 2 ports may be configurable for uplink. The presence and density phase tracking reference signals may depend on modulation and coding scheme and resource block allocation size.

In some examples, the resource blocks including phase tracking reference signal may be derived from the scheduled resource blocks and the associated frequency density (e.g., phase tracking reference signal may not be mapped to resource blocks that are not scheduled for the UE). For a given resource block, if present, one phase tracking reference signal port may map on one subcarrier carrying one or more demodulation reference signal ports of the associated demodulation reference signal port group. In some examples, the base station 205 may transmit an RRC configuration indication one or more thresholds in density tables. In some examples, the UE 215 may be configured with two sets of thresholds M={ptrsthMCSj, j=1, 2, 3, 4} and R={ptrsthRBn, n=0, 2, 4}, independently per bandwidth part, using dedicated RRC signaling for uplink and downlink respectively. In some examples, the UE 215 may signal a UE capability associated with thresholds. As UE capability, at a given carrier frequency, for each subcarrier spacing applicable to data channel at this carrier frequency, the UE 215 may report modulation and coding scheme or bandwidth thresholds based on its phase noise characteristics.

If downlink phase tracking reference signal presence or uplink phase tracking reference signal presence (e.g., DL-PTRS-present/UL-PTRS-present) is enabled, the UE 215 may determine a density of phase tracking reference signals from Table 1. In particular, when phase tracking reference signal is present, one phase tracking reference signal port may be present in every OFDM symbol and every $2^{nd}$ resource block unless downlink or uplink density tables are configured by RRC signaling. For SU-MIMO, a predefined & RRC-configured association between phase tracking reference signal densities and scheduled modulation and coding scheme or bandwidth is depicted in Table 1 and Table 2:

TABLE 1

| Scheduled Modulation and Coding Scheme | Time density |
|---|---|
| $I_{MCS}$ < ptrs-MCS$_1$ | Phase tracking reference signal is not present |
| ptrs-MCS1 $I_{MCS}$ < ptrs-MCS2 | 4 |
| ptrs-MCS2 $I_{MCS}$ < ptrs-MCS3 | 2 |
| ptrs-MCS3 $I_{MCS}$ < ptrs-MCS4 | 1 |

TABLE 2

| Contiguous Scheduled Bandwidth | Frequency density (1/n) |
|---|---|
| $N_{RB} < N_{RB0}$ | Phase tracking reference signal is not present |
| $N_{RB0}\ N_{RB} < N_{RB1}$ | 2 |
| $N_{RB1} >= N_{RB}$ | 4 |

For CP-OFDM, the time-densities may indicate that every $4^{th}$ symbol or every $2^{nd}$ symbol or every symbol include a phase tracking reference signal. For CP-OFDM, the frequency-densities may include occupying one subcarrier (may be in a subset of resource elements) in every resource block or every $2^{nd}$ resource block or every $4^{th}$ resource block. In some examples, the time density of a phase tracking reference signal of a phase tracking reference signal may increase with increasing a scheduled modulation and coding scheme (except for reserved modulation and coding schemes). Additionally or alternatively, the frequency density of a phase tracking reference signal may decrease with increasing the scheduled bandwidth (i.e., the number of scheduled resource blocks).

In some examples, the phase tracking reference signal may be applicable to the CP-OFDM waveform and may have its own scrambling. The phase tracking reference signal may include a repetition of one of the demodulation reference signal within the data channel. The repetition depicted herein may include a repetition of a subset of the demodulation reference signal resource elements of one demodulation reference signal port. The modulation values of the first demodulation reference signal symbol before applying a Walsh orthogonal cover code may be repeated. In an OFDM symbol including demodulation reference signal, a phase tracking reference signal may not be inserted. Instead, wireless device may use the demodulation reference signal observation for phase noise estimation. In some examples, the symbol counting for time domain density may be reset at every demodulation reference signal symbol.

According to one or more aspects of the present disclosure, the UE 215 may be configured to determine a location for transmitting phase tracking reference signal symbols. In particular, the UE 215 may utilize the techniques depicted herein to determine a location for phase tracking reference signal in a time interval where demodulation reference signal symbols are absent. The base station 205 may allocate time and frequency resources for one or multiple data channels including downlink data channels (e.g., physical downlink shared channel) and uplink data channels (e.g., physical uplink shared channel). In the example of FIG. 2, the base station 205 may schedule a first physical uplink shared channel 225-a, a second physical uplink shared channel 225-b and a third physical uplink shared channel 225-c.

In some examples, a UE 215 may receive a downlink control indicator including a demodulation reference signal configuration for upcoming time intervals. The UE 215 may then determine that a time interval does not include demodulation reference signal symbols. In the example of FIG. 2, the UE 215 may determine that the first physical uplink shared channel 225-a includes demodulation reference signal symbols and the third physical uplink shared channel 225-c includes demodulation reference signal symbols. The UE 215 may also determine that the second physical uplink shared channel 225-b does not include demodulation reference signal symbols. According to one or more aspects of the present disclosure, the UE 215 may determine a location for phase tracking reference signal in the time interval where demodulation reference signal is absent (e.g., in the time interval including the second physical uplink shared channel 225-b). The UE 215 may then transmit the phase tracking reference signal in the determined location. In particular, aspects depicted herein provide for one or more configurations (or rules) used by UEs in determining a location for transmitting phase tracking reference signal symbols in a time interval where demodulation reference signal symbols are absent.

In some examples, the UE 215 may determine the location of phase tracking reference signal as a beginning of the time interval where demodulation reference signal symbols are absent. In some examples, the UE 215 may identify a first symbol and may then apply a shift in time to the first symbol to identify the location for transmitting the phase tracking reference signal. The UE 215 may also use the beginning of a time interval including the second physical uplink shared channel 225-b as the basis for symbol counting and location of phase tracking reference signal symbols. In another example, the location of phase tracking reference signal in the time interval may be based on the location of demodulation reference signal on a previous physical uplink shared channel (or physical downlink shared channel copy) or a location of eliminated demodulation reference signal resource elements in that slot. In the example of FIG. 2, the UE 215 may determine the location of phase tracking reference signal in the time interval including the second physical uplink shared channel 225-b based on the location of demodulation reference signal on the first physical uplink shared channel 225-a.

In some examples, the UE 115 may be configured with multiple predefined or preconfigured options for counting symbols for phase tracking reference signal (for physical uplink shared channel or physical downlink shared channel copies without demodulation reference signal). In some instances, one option from the set of predefined or preconfigured options may be selected by a scheduling downlink control indicator. In some examples, the set of predefined or preconfigured options may be a subset of a predefined set of options.

In some examples, phase tracking reference signals (for the physical uplink shared channel or physical downlink shared channel copy without demodulation reference signal) may have more time density at the edges of a time assignment (i.e., close to the beginning and end of the set of symbols indicated in a time domain resource allocation). In some examples, prior to transmitting the phase tracking reference signal, the UE 215 may receive an RRC control signal including a configuration for a set of time densities associated with the phase tracking reference signal. The UE 215 may the identify a time density from the set of time densities based on the received configuration. In such cases, the UE 515 may transmit the phase tracking reference signal according to the identified time density. Thus, the techniques depicted herein may be applicable to different frequency ranges and/or frequency bands and/or subcarrier spacings.

Figure 3:
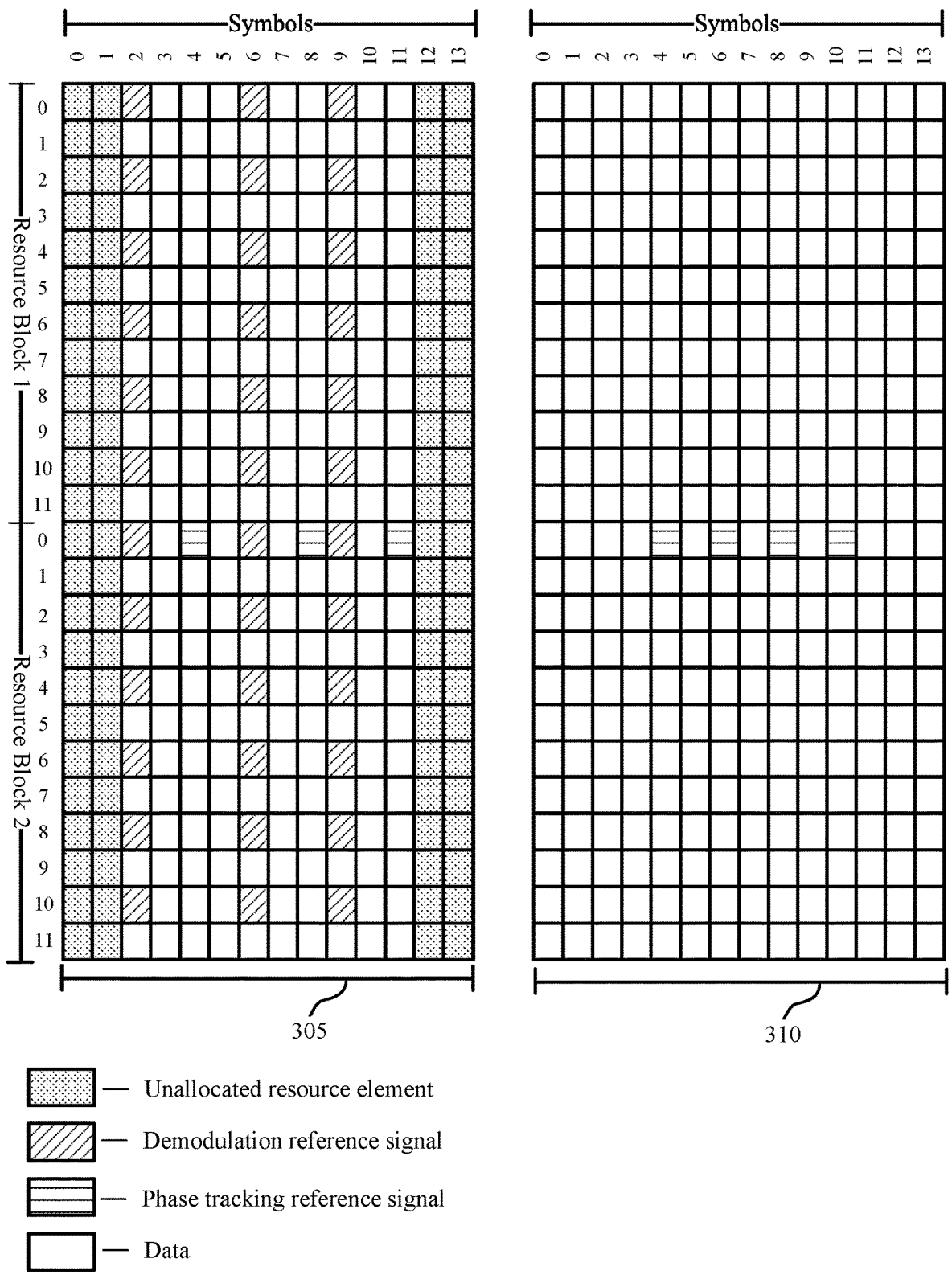
FIG. 3 illustrates an example of a set of resource grids that supports techniques for determining phase tracking reference signal location in accordance with various aspects of the present disclosure.

FIG. 3 illustrates an example of a set of resource grids 300 that supports techniques for determining phase tracking reference signal location in accordance with various aspects of the present disclosure. The set of resource grids 300 may implement aspects of the wireless communications system 100 and wireless communications system 200 described with reference to FIGS. 1 and 2, respectively. For example, the set of resource grids 300 may be based on a configuration by a base station 105 and implemented by a UE 115. The set of resource grids 300 may be used to determine phase tracking reference signal location to achieve greater reliability and lower latency operations in a wireless communications system. The set of resource grids 300 may also be based on a configuration by the base station 105, and implemented by the UE 115 to decrease power consumption by the UE 115 while performing phase-tracking operations (e.g., phase tracking reference signal transmissions), among other benefits.

In the example illustrated in FIG. 3, the set of resource grids 300 include a first resource grid 305 and a second resource grid 310, which include time resources (e.g., symbols, minislots, slots, subframes, or a frame) as well as frequency resources (e.g., carriers or subcarriers). A combination of a time resource, such as a symbol, and a frequency resource, such as a subcarrier, may define an associated resource element. In the example illustrated in FIG. 3, the base station 105 schedules the UE 115 with multiple physical uplink shared channels. For example, the first resource grid 305 may be associated with a first scheduled physical uplink shared channel, while the second resource grid 310 may be associated with a second scheduled physical uplink shared channel.

In some examples, the UE 115 may transmit a phase tracking reference signal transmission on the first scheduled physical uplink shared channel using one or more phase tracking reference signal resources associated with the first resource grid 305. The first resource grid 305 and the second resource grid 310 may include 2 resource blocks (resource block 1 and resource block 2). Each resource block may include 12 frequency resources (e.g., carriers or subcarriers) and 14 time resources (e.g., symbols, minislots, slots, subframes, or a frame). The first resource grid 305 may include resource elements including unallocated resource elements, demodulation reference signal, phase tracking reference signal and data. The second resource grid 310 may include resource elements without demodulation reference signal.

In the example in FIG. 3, the UE 115 may determine that demodulation reference signal is absent in the second resource grid 310. The UE 115 may determine a location for transmitting a phase tracking reference signal the second resource grid 310. In the case that demodulation reference signal bundling is activated and demodulation reference signal is eliminated in a physical uplink shared channel (or physical downlink shared channel copy), the UE 115 may determine the location of phase tracking reference signal of a time interval based on a location of eliminated demodulation reference signal resource elements on that time interval. In the example of FIG. 3, the UE 115 may determine a location of a resource element associated with an eliminated demodulation reference signal in the second resource grid 310. In some examples, the location for the eliminated demodulation reference signal in the second resource grid 310 may be at a resource element located on the 3rd symbol and the 0th resource element of resource block 2 of the second resource grid 310. The UE 115 may determine the location for transmitting the phase tracking reference signal in the second resource grid 310 based on the location of the resource element associated with the eliminated demodulation reference signal. In the example of FIG. 3, the UE 115 may transmit phase tracking reference signal on the 4th, 6th, 8th and 10th symbols of the 0th resource element of resource block 2 of the second resource grid 310.

In some examples, the UE 115 may determine the location of phase tracking reference signal of a first time interval based on a location of demodulation reference signal in a second time interval preceding the first time interval. In the example of FIG. 3, the UE 115 may determine a location of the resource element including the demodulation reference signal in the first resource grid 305. The UE 115 may determine the location for transmitting the phase tracking reference signal in the second resource grid 310 based on the location of the resource element associated with the demodulation reference signal in the first resource grid 305. In some examples, the UE 115 may transmit phase tracking reference signal on the 4th, 6th, 8th and 10th symbols of the 0th resource element of resource block 2 of the second resource grid 310 based on a location of demodulation reference signal in the first resource grid 305.

Figure 4:
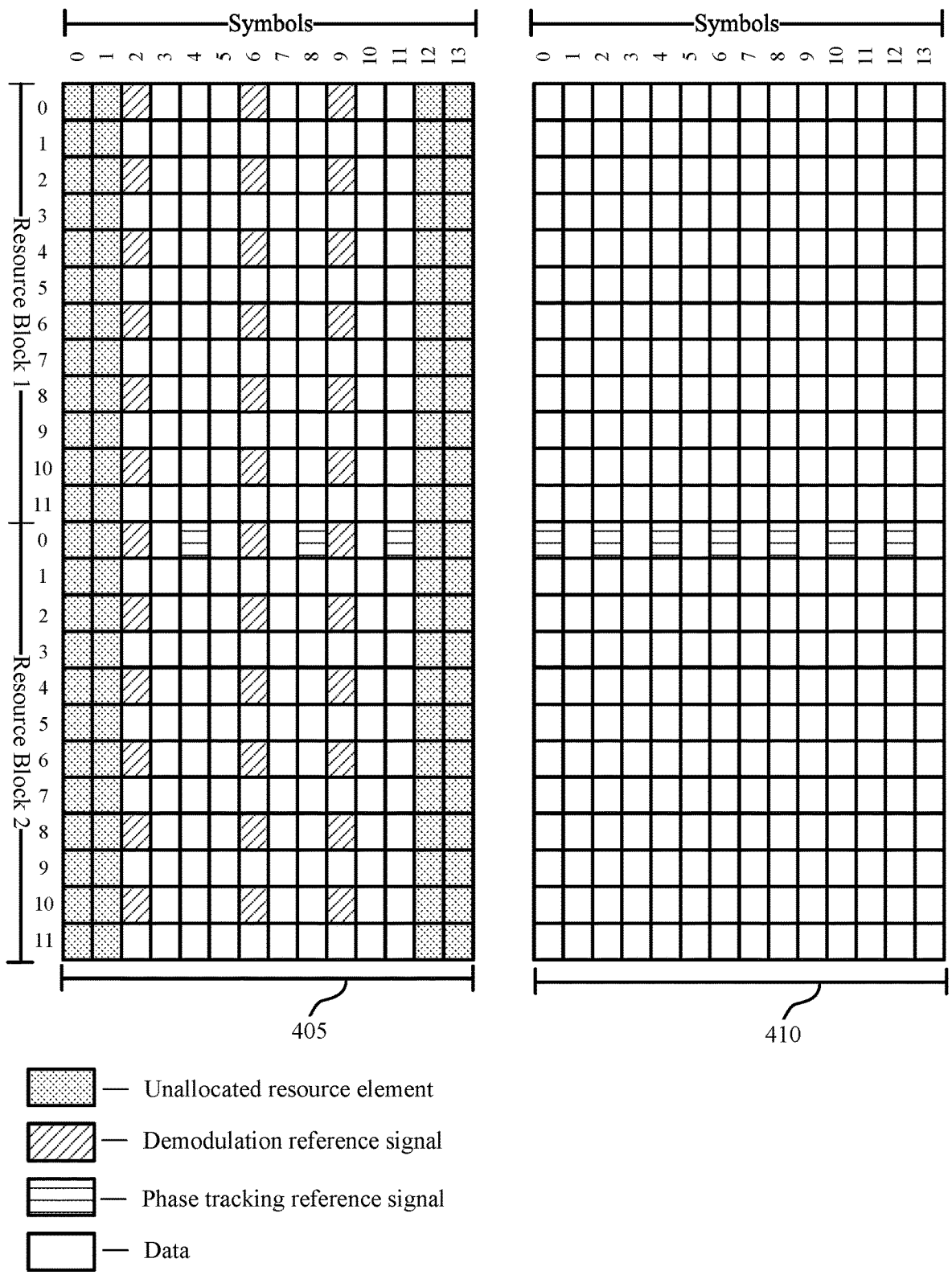
FIG. 4 illustrates an example of a set of resource grids that supports techniques for determining phase tracking reference signal location in accordance with various aspects of the present disclosure.

FIG. 4 illustrates an example of a set of resource grids 400 that supports techniques for determining phase tracking reference signal location in accordance with various aspects of the present disclosure. The set of resource grids 400 may implement aspects of the wireless communications system 100 and wireless communications system 200 described with reference to FIGS. 1 and 2, respectively. For example, the set of resource grids 400 may be based on a configuration by a base station 105 and implemented by a UE 115. The set of resource grids 400 may be used to determine phase tracking reference signal location to achieve greater reliability and lower latency operations in a wireless communications system. The set of resource grids 400 may also be based on a configuration by the base station 105, and implemented by the UE 115 to decrease power consumption by the UE 115 while performing phase-tracking operations (e.g., phase tracking reference signal transmissions), among other benefits.

In the example illustrated in FIG. 4, the set of resource grids 400 include a first resource grid 405 and a second resource grid 410, which include time resources (e.g., symbols, minislots, slots, subframes, or a frame) as well as frequency resources (e.g., carriers or subcarriers). A combination of a time resource, such as a symbol, and a frequency resource, such as a subcarrier, may define an associated resource element. In the example illustrated in FIG. 4, the base station 105 schedules the UE 115 with multiple physical uplink shared channels. For example, the first resource grid 405 may be associated with a first scheduled physical uplink shared channel, while the second resource grid 410 may be associated with a second scheduled physical uplink shared channel.

In some examples, the UE 115 may transmit a phase tracking reference signal transmission on the first scheduled physical uplink shared channel using one or more phase tracking reference signal resources associated with the first resource grid 405. The first resource grid 405 and the second resource grid 410 may include 2 resource blocks (resource block 1 and resource block 2). Each resource block may include 12 frequency resources (e.g., carriers or subcarriers) and 14 time resources (e.g., symbols, minislots, slots, subframes, or a frame). The first resource grid 405 may include resource elements including unallocated resource elements, demodulation reference signal, phase tracking reference signal and data. The second resource grid 410 may include resource elements without demodulation reference signal.

In the example in FIG. 4, the UE 115 may determine that demodulation reference signal is absent in the second resource grid 410. The UE 115 may determine a location for transmitting a phase tracking reference signal the second resource grid 410 at a symbol at a beginning of the second resource grid 410 based on a time domain resource allocation. In such cases, the UE 115 may identify a time domain resource allocation indicated via the control message from the base station 105. In the example of FIG. 4, the UE 115 may transmit phase tracking reference signal on the 0th, 2nd, 4th, 6th, 8th. 10th and 12th symbols of the 0th resource element of resource block 2 of the second resource grid 410.

Figure 5:
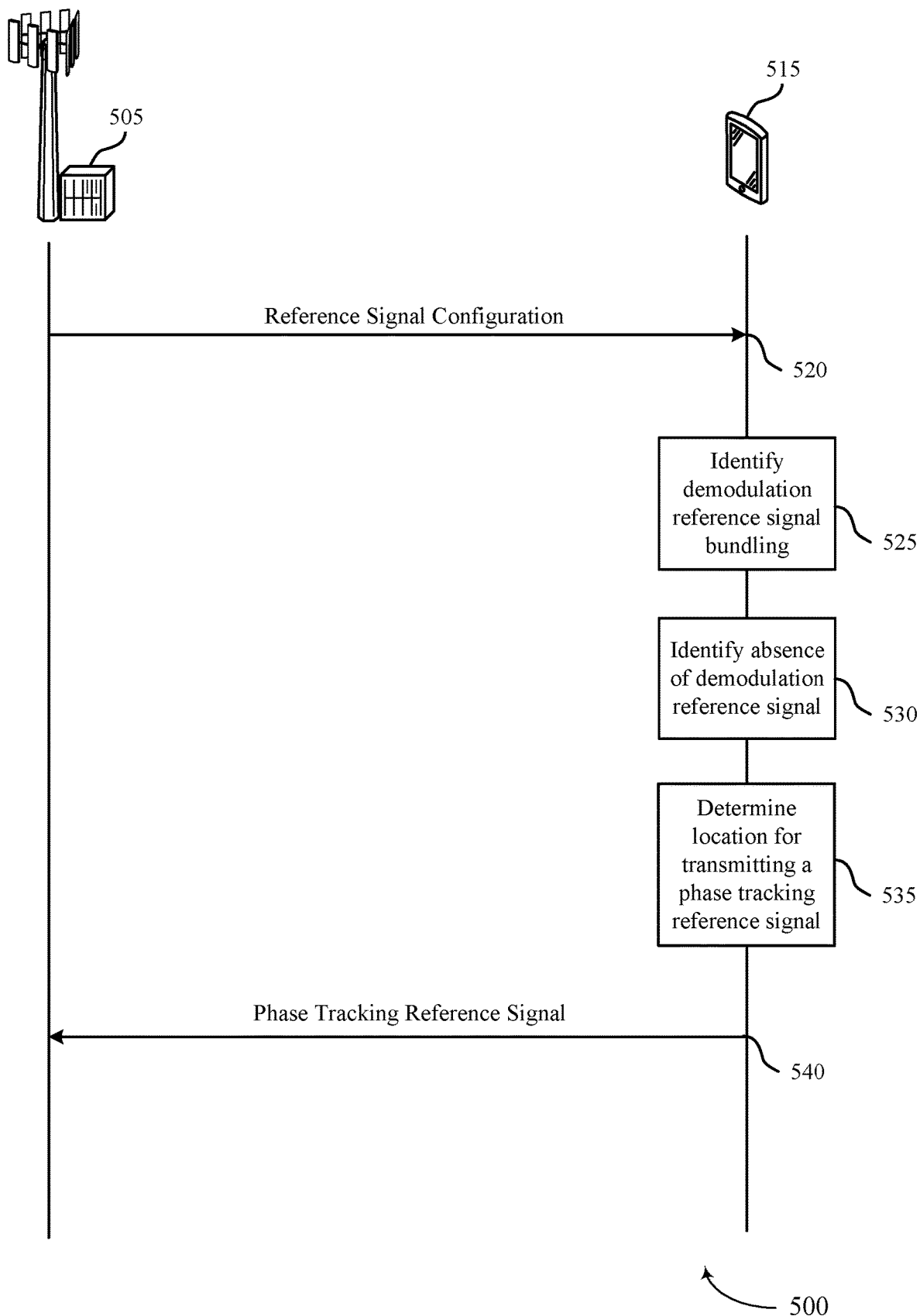
FIG. 5 illustrates an example of a process flow that supports techniques for determining phase tracking reference signal location in accordance with various aspects of the present disclosure.

FIG. 5 illustrates an example of a process flow 500 that supports techniques for determining phase tracking reference signal location in accordance with various aspects of the present disclosure. In some examples, process flow 500 may implement aspects of wireless communications system 100 and wireless communications system 200. A UE 515 may be an example of a UE 115 described with reference to FIGS. 1 and 2 and a base station 505 may be an example of a base station 105 described with reference to FIGS. 1 and 2.

In the following description of the process flow 500, the operations between the base station 505 and the UE 515 may be transmitted in a different order than the exemplary order shown. The operations performed by the base station 505 or the UE 515 may be performed in different orders or at different times than the exemplary order shown. Some operations may also be omitted from the process flow 500, or other operations may be added to the process flow 500. Further, the base station 505 and the UE 515 are not limiting, as the described features may be associated with any number of different devices.

At 520, the UE 515 may receive a control message. For example. the base station 505 may transmit a control message including an indication of a reference signal configuration associated with one or more physical channels scheduled during a set of time intervals. In some examples, the control message may include a downlink control indicator. The one or more physical channels may include a physical uplink shared channel or a physical downlink shared channel or both.

Additionally or alternatively, the UE 515 may receive, from the base station 505, a configuration message including a first configuration and a second configuration. The first configuration and the second configuration may be utilized for counting one or more symbols for transmitting a phase tracking reference signal. In some examples, the control message may select the first configuration or the second configuration for counting the one or more symbols for transmitting the phase tracking reference signal. In some examples, a location for transmitting the phase tracking reference signal may be based on the selected configuration. As depicted herein, the first configuration and the second configuration may be a subset of a set of configurations.

At 525, the UE 515 may identify that the control message indicates that demodulation reference signal bundling is activated for the set of time intervals. In some examples, demodulation reference signal may be absent in a first time interval, and a second time interval preceding the first time interval and a third time interval succeeding the first time interval may include the demodulation reference signal.

At 530, the UE 515 may identify that the demodulation reference signal is absent in the first time interval. In particular, the UE 515 may determine that demodulation reference signal is present is time intervals adjacent to the first time interval but absent in the first time interval.

At 535, the UE 515 may determine a location for transmitting a phase tracking reference signal in the first time interval of the set of time intervals. In some examples, the UE 515 may determine the location for transmitting the phase tracking reference signal based on the control message. As described with reference to FIG. 5, the demodulation reference signal is absent in the first time interval.

In some examples, the UE 515 may identify a time domain resource allocation indicated via the control message. The UE 515 may then identify a symbol at a beginning of the first time interval of the set of time intervals based on the time domain resource allocation. The location for transmitting the phase tracking reference signal in the first time interval may include the symbol at the beginning of the first time interval.

Additionally or alternatively, the UE 515 may identify a first symbol within the first time interval of the set of time intervals. The UE 515 may then apply a shift in time to the first symbol to identify a second symbol within the first time interval. In some examples, the location for transmitting the phase tracking reference signal in the first time interval may include the second symbol within the first time interval.

In some examples, the UE 515 may determine a location of a resource element including the demodulation reference signal in a second time interval preceding the first time interval of the set of time intervals. The location for transmitting the phase tracking reference signal in the first time interval may be based on the location of the resource element comprising the demodulation reference signal in the second time interval.

In some examples, the UE 515 may determine a location of a resource element associated with an eliminated demodulation reference signal in the first time interval of the set of time intervals. The UE 515 may then determine the location for transmitting the phase tracking reference signal in the first time interval based on the location of the resource element associated with the eliminated demodulation reference signal.

At 540, the UE 515 may transmit the phase tracking reference signal at the determined location to the base station 505. In particular, the UE 515 may transmit the phase tracking reference signal in the first time interval. In some examples, the UE 515 may transmit the phase tracking reference signal on a first set of resource elements with a first time density and on a second set of resource elements with a second time density. In some instances, the first time density may be greater than the second time density and the first set of resource elements may be located at an edge of the first time interval.

In some examples, prior to transmitting the phase tracking reference signal, the UE 515 may receive an RRC control signal including a configuration for a set of time densities associated with the phase tracking reference signal. The UE 515 may identify a time density from the set of time densities based on the received configuration. In such cases, the UE 515 may transmit the phase tracking reference signal according to the identified time density.

Figure 6:
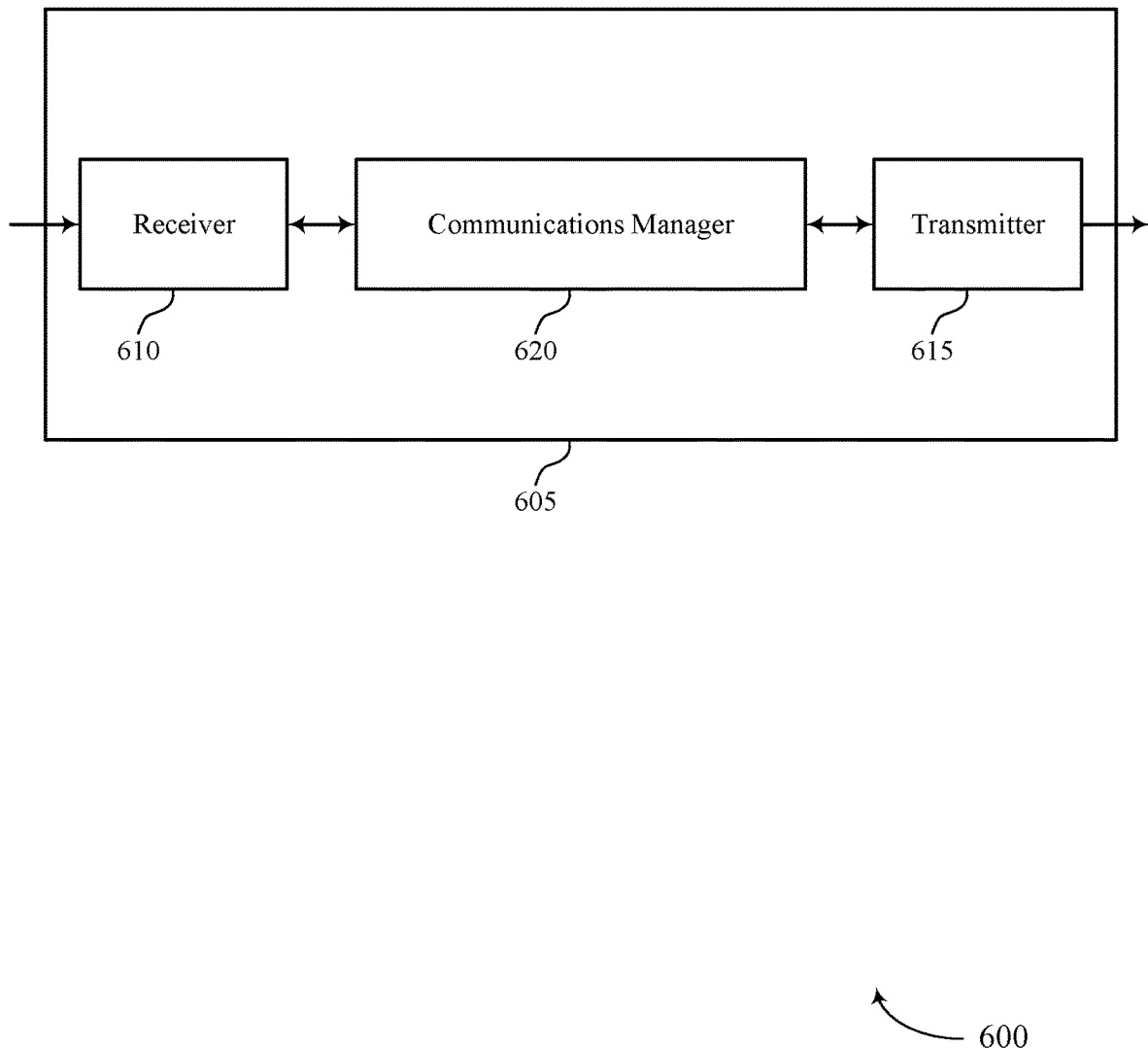
FIGS. 6 and 7 show block diagrams of devices that support techniques for determining phase tracking reference signal location in accordance with various aspects of the present disclosure.

FIG. 6 shows a block diagram 600 of a device 605 that supports techniques for determining phase tracking reference signal location in accordance with various aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for determining phase tracking reference signal location). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for determining phase tracking reference signal location). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for determining phase tracking reference signal location as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, a control message including an indication of a reference signal configuration associated with one or more physical channels scheduled during a set of multiple time intervals. The communications manager 620 may be configured as or otherwise support a means for determining, based on the control message, a location for transmitting a phase tracking reference signal in a first time interval of the set of multiple time intervals, where a demodulation reference signal is absent in the first time interval. The communications manager 620 may be configured as or otherwise support a means for transmitting, to the base station, the phase tracking reference signal in the first time interval at the determined location.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, more efficient utilization of communication resources.

Figure 7:
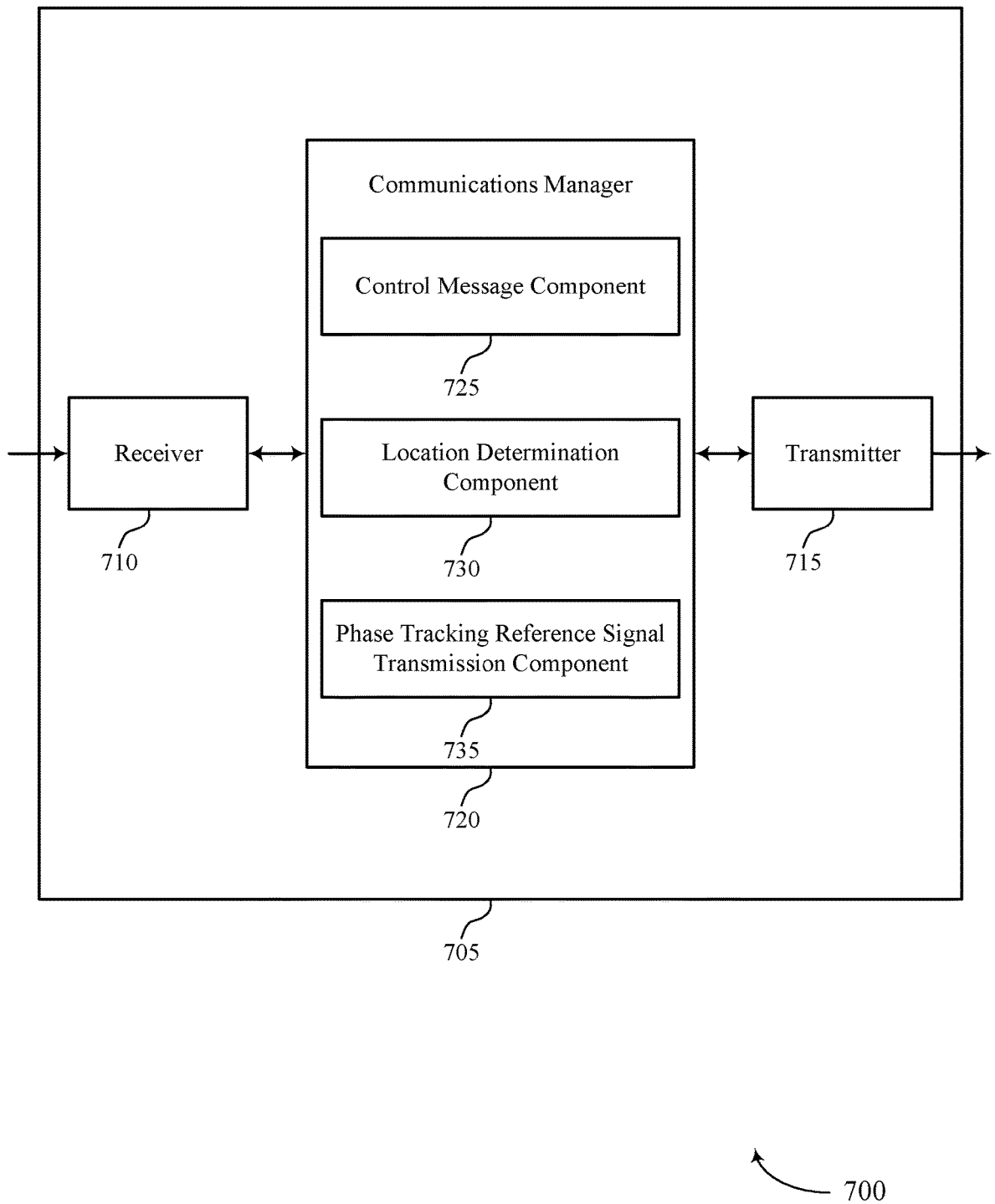

FIG. 7 shows a block diagram 700 of a device 705 that supports techniques for determining phase tracking reference signal location in accordance with various aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for determining phase tracking reference signal location). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for determining phase tracking reference signal location). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for determining phase tracking reference signal location as described herein. For example, the communications manager 720 may include a control message component 725, a location determination component 730, a phase tracking reference signal transmission component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The control message component 725 may be configured as or otherwise support a means for receiving, from a base station, a control message including an indication of a reference signal configuration associated with one or more physical channels scheduled during a set of multiple time intervals. The location determination component 730 may be configured as or otherwise support a means for determining, based on the control message, a location for transmitting a phase tracking reference signal in a first time interval of the set of multiple time intervals, where a demodulation reference signal is absent in the first time interval. The phase tracking reference signal transmission component 735 may be configured as or otherwise support a means for transmitting, to the base station, the phase tracking reference signal in the first time interval at the determined location.

Figure 8:
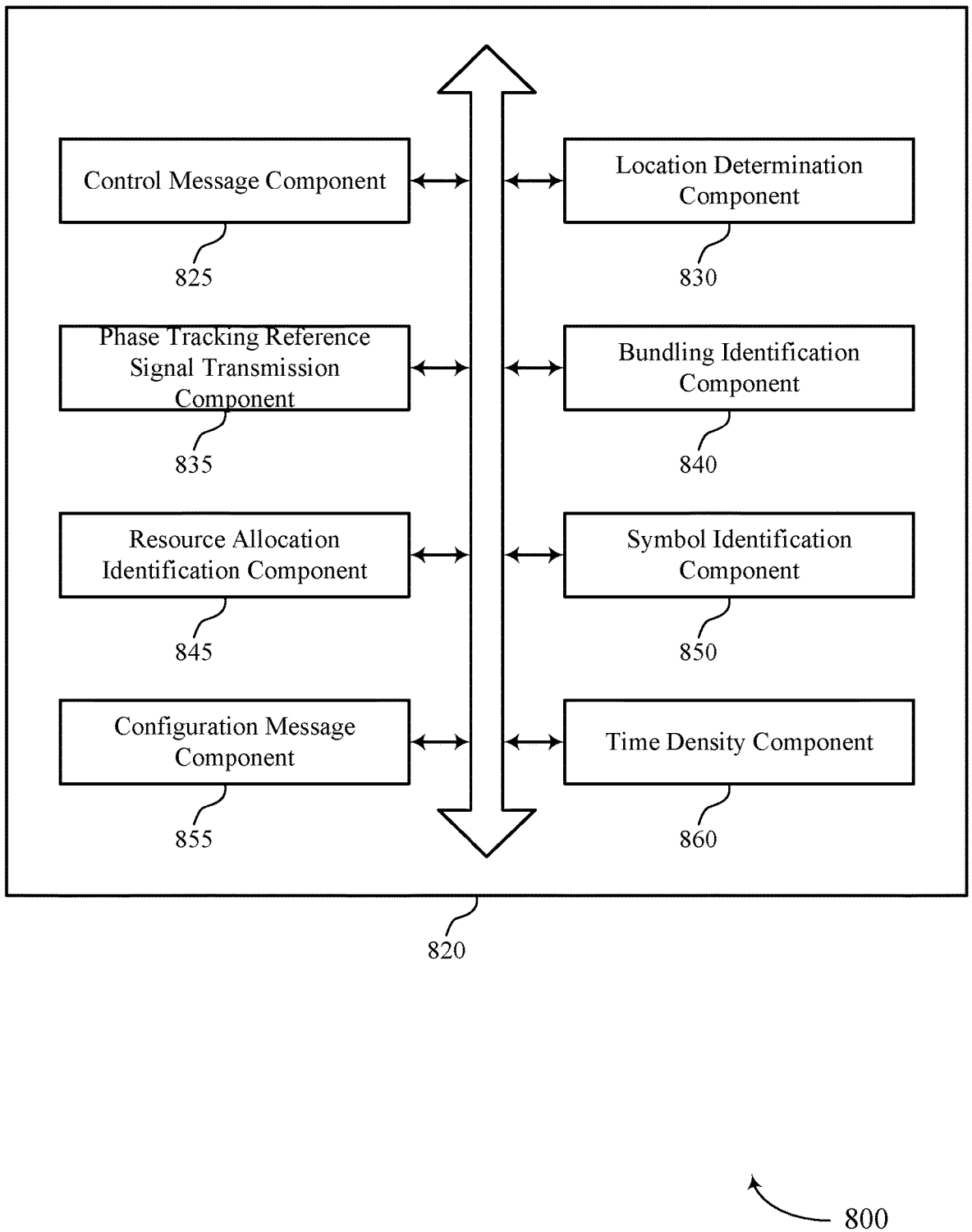
FIG. 8 shows a block diagram of a communications manager that supports techniques for determining phase tracking reference signal location in accordance with various aspects of the present disclosure.

FIG. 8 shows a block diagram 800 of a communications manager 820 that supports techniques for determining phase tracking reference signal location in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for determining phase tracking reference signal location as described herein. For example, the communications manager 820 may include a control message component 825, a location determination component 830, a phase tracking reference signal transmission component 835, a bundling identification component 840, a resource allocation identification component 845, a symbol identification component 850, a configuration message component 855, a time density component 860, or any combination thereof. Each of these components may communicate, directly or indirectly, with one another (e.g., via one or more buses).

The communications manager 820 may support wireless communication at a UE in accordance with examples as disclosed herein. The control message component 825 may be configured as or otherwise support a means for receiving, from a base station, a control message including an indication of a reference signal configuration associated with one or more physical channels scheduled during a set of multiple time intervals. The location determination component 830 may be configured as or otherwise support a means for determining, based on the control message, a location for transmitting a phase tracking reference signal in a first time interval of the set of multiple time intervals, where a demodulation reference signal is absent in the first time interval. The phase tracking reference signal transmission component 835 may be configured as or otherwise support a means for transmitting, to the base station, the phase tracking reference signal in the first time interval at the determined location.

In some examples, the bundling identification component 840 may be configured as or otherwise support a means for identifying that the control message indicates that demodulation reference signal bundling is activated for the set of multiple time intervals, where a second time interval preceding the first time interval and a third time interval succeeding the first time interval include the demodulation reference signal.

In some examples, the resource allocation identification component 845 may be configured as or otherwise support a means for identifying a time domain resource allocation indicated via the control message. In some examples, the location determination component 830 may be configured as or otherwise support a means for identifying a symbol at a beginning of the first time interval of the set of multiple time intervals based on the time domain resource allocation, where the location for transmitting the phase tracking reference signal in the first time interval includes the symbol at the beginning of the first time interval.

In some examples, the symbol identification component 850 may be configured as or otherwise support a means for identifying a first symbol within the first time interval of the set of multiple time intervals. In some examples, the location determination component 830 may be configured as or otherwise support a means for applying a shift in time to the first symbol to identify a second symbol within the first time interval, where the location for transmitting the phase tracking reference signal in the first time interval includes the second symbol within the first time interval.

In some examples, to support determining the location for transmitting the phase tracking reference signal in the first time interval, the location determination component 830 may be configured as or otherwise support a means for determining a location of a resource element including the demodulation reference signal in a second time interval preceding the first time interval of the set of multiple time intervals, where the location for transmitting the phase tracking reference signal in the first time interval is based on the location of the resource element including the demodulation reference signal in the second time interval.

In some examples, to support determining the location for transmitting the phase tracking reference signal in the first time interval, the location determination component 830 may be configured as or otherwise support a means for determining a location of a resource element associated with an eliminated demodulation reference signal in the first time interval of the set of multiple time intervals, where the location for transmitting the phase tracking reference signal in the first time interval is based on the location of the resource element associated with the eliminated demodulation reference signal.

In some examples, the configuration message component 855 may be configured as or otherwise support a means for receiving, from the base station, a configuration message including a first configuration and a second configuration for counting one or more symbols for transmitting the phase tracking reference signal.

In some examples, to support receiving the control message, the control message component 825 may be configured as or otherwise support a means for receiving, from the base station, the control message selecting the first configuration or the second configuration for counting the one or more symbols for transmitting the phase tracking reference signal, where the location for transmitting the phase tracking reference signal is based on the selected configuration. In some examples, the first configuration and the second configuration include a subset of a set of multiple configurations.

In some examples, the control message component 825 may be configured as or otherwise support a means for receiving an RRC signal including a configuration for a set of multiple time densities associated with the phase tracking reference signal. In some examples, the time density component 860 may be configured as or otherwise support a means for identifying a time density from the set of multiple time densities based on the received configuration, where transmitting the phase tracking reference signal includes transmitting the phase tracking reference signal according to the identified time density.

In some examples, to support transmitting the phase tracking reference signal, the phase tracking reference signal transmission component 835 may be configured as or otherwise support a means for transmitting the phase tracking reference signal on a first set of resource elements with a first time density and on a second set of resource elements with a second time density, the first time density being greater than the second time density.

In some examples, the first set of resource elements is located at an edge of the first time interval. In some examples, the control message includes a downlink control indicator. In some examples, the one or more physical channels include a physical uplink shared channel or a physical downlink shared channel or both.

Figure 9:
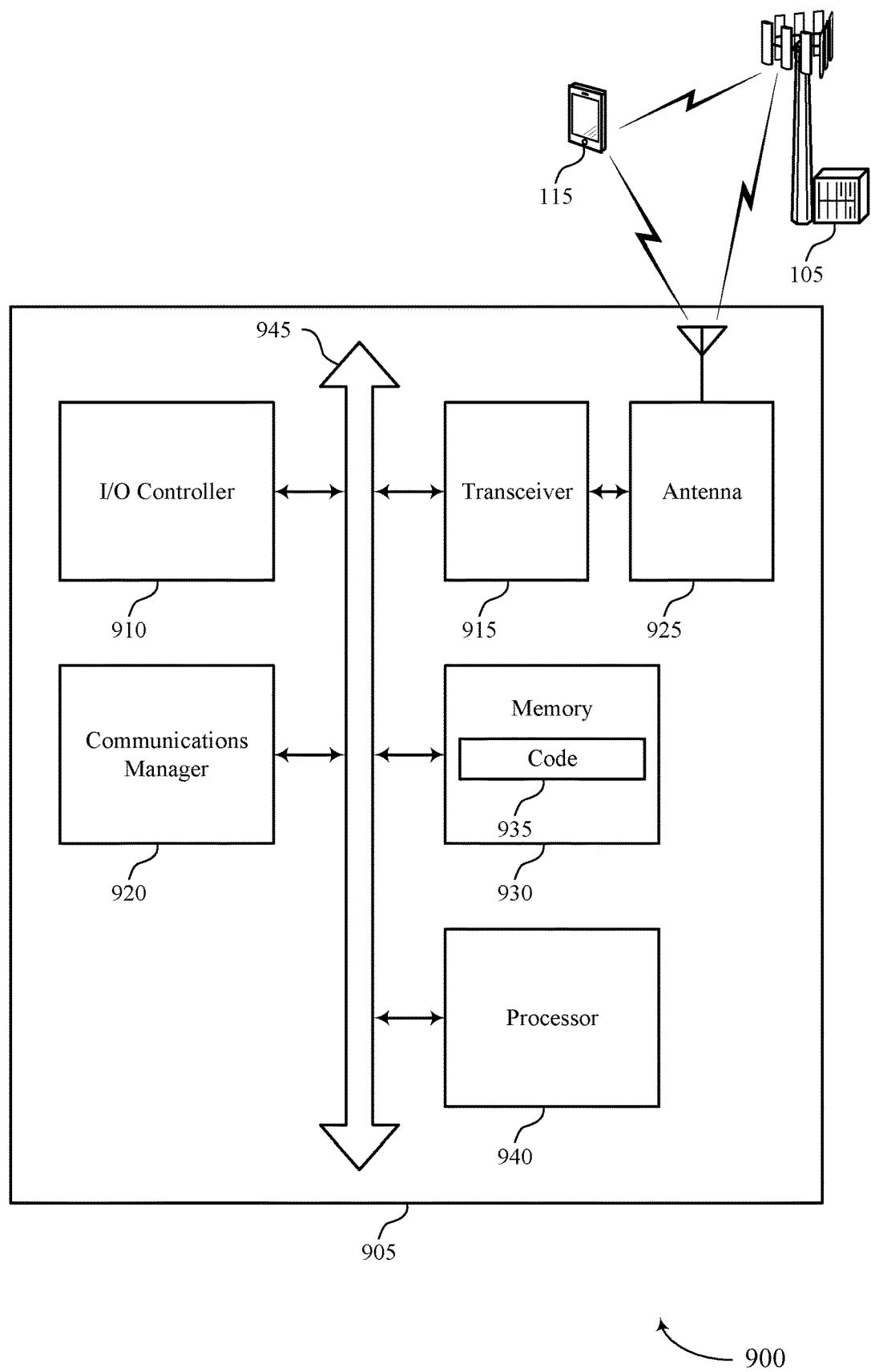
FIG. 9 shows a diagram of a system including a device that supports techniques for determining phase tracking reference signal location in accordance with various aspects of the present disclosure.

FIG. 9 shows a diagram of a system 900 including a device 905 that supports techniques for determining phase tracking reference signal location in accordance with various aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for determining phase tracking reference signal location). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, a control message including an indication of a reference signal configuration associated with one or more physical channels scheduled during a set of multiple time intervals. The communications manager 920 may be configured as or otherwise support a means for determining, based on the control message, a location for transmitting a phase tracking reference signal in a first time interval of the set of multiple time intervals, where a demodulation reference signal is absent in the first time interval. The communications manager 920 may be configured as or otherwise support a means for transmitting, to the base station, the phase tracking reference signal in the first time interval at the determined location.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for determining phase tracking reference signal location as described herein, or the processor 940 and the memory 930 may be otherwise configured to perform or support such operations.

Figure 10:
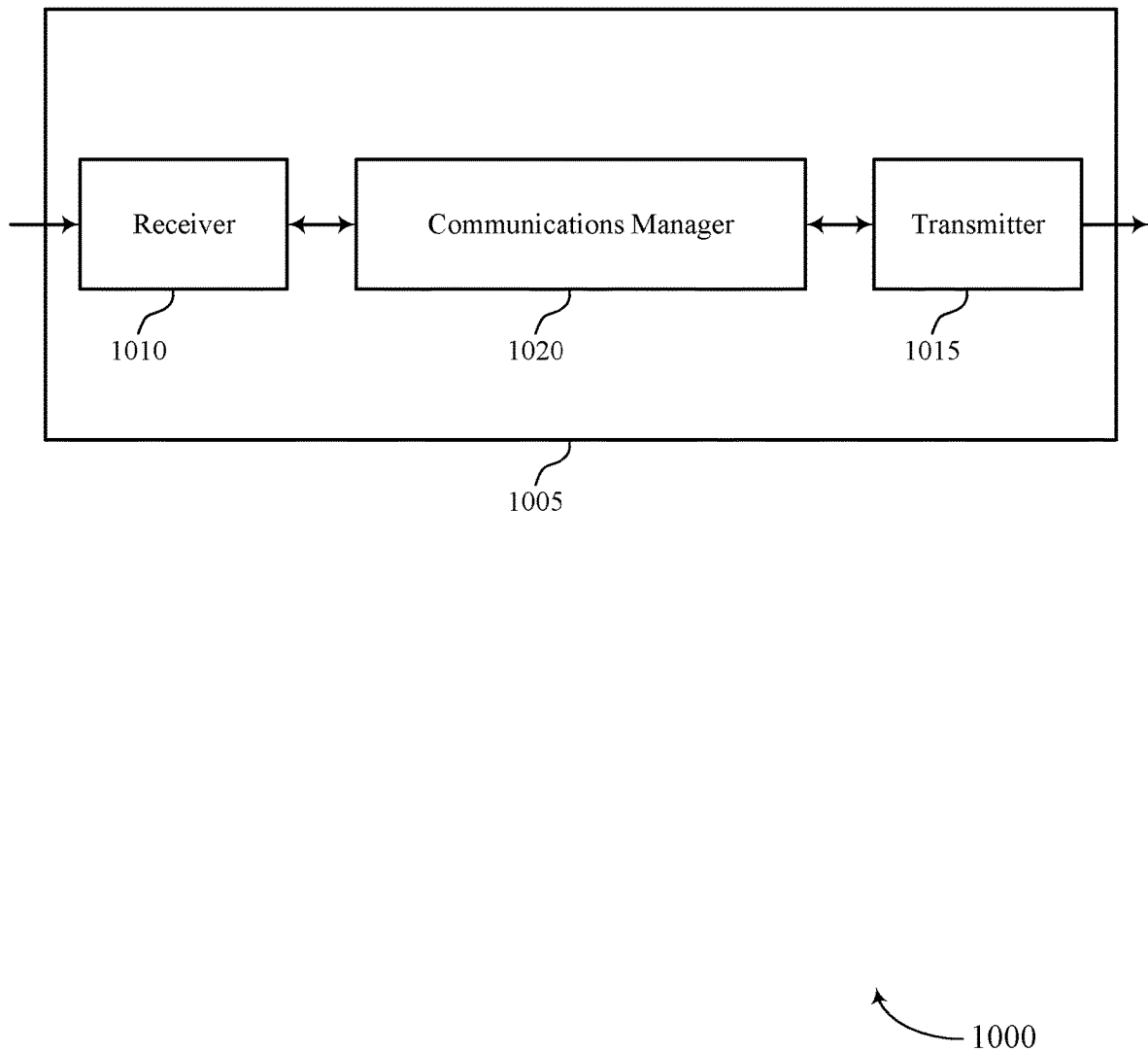
FIGS. 10 and 11 show block diagrams of devices that support techniques for determining phase tracking reference signal location in accordance with various aspects of the present disclosure.

FIG. 10 shows a block diagram 1000 of a device 1005 that supports techniques for determining phase tracking reference signal location in accordance with various aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for determining phase tracking reference signal location). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for determining phase tracking reference signal location). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for determining phase tracking reference signal location as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, a control message including an indication of a reference signal configuration associated with one or more physical channels scheduled during a set of multiple time intervals. The communications manager 1020 may be configured as or otherwise support a means for receiving, from the UE and based on the control message, a phase tracking reference signal at a location in a first time interval of the set of multiple time intervals, where a demodulation reference signal is absent in the first time interval.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, more efficient utilization of communication resources.

Figure 11:
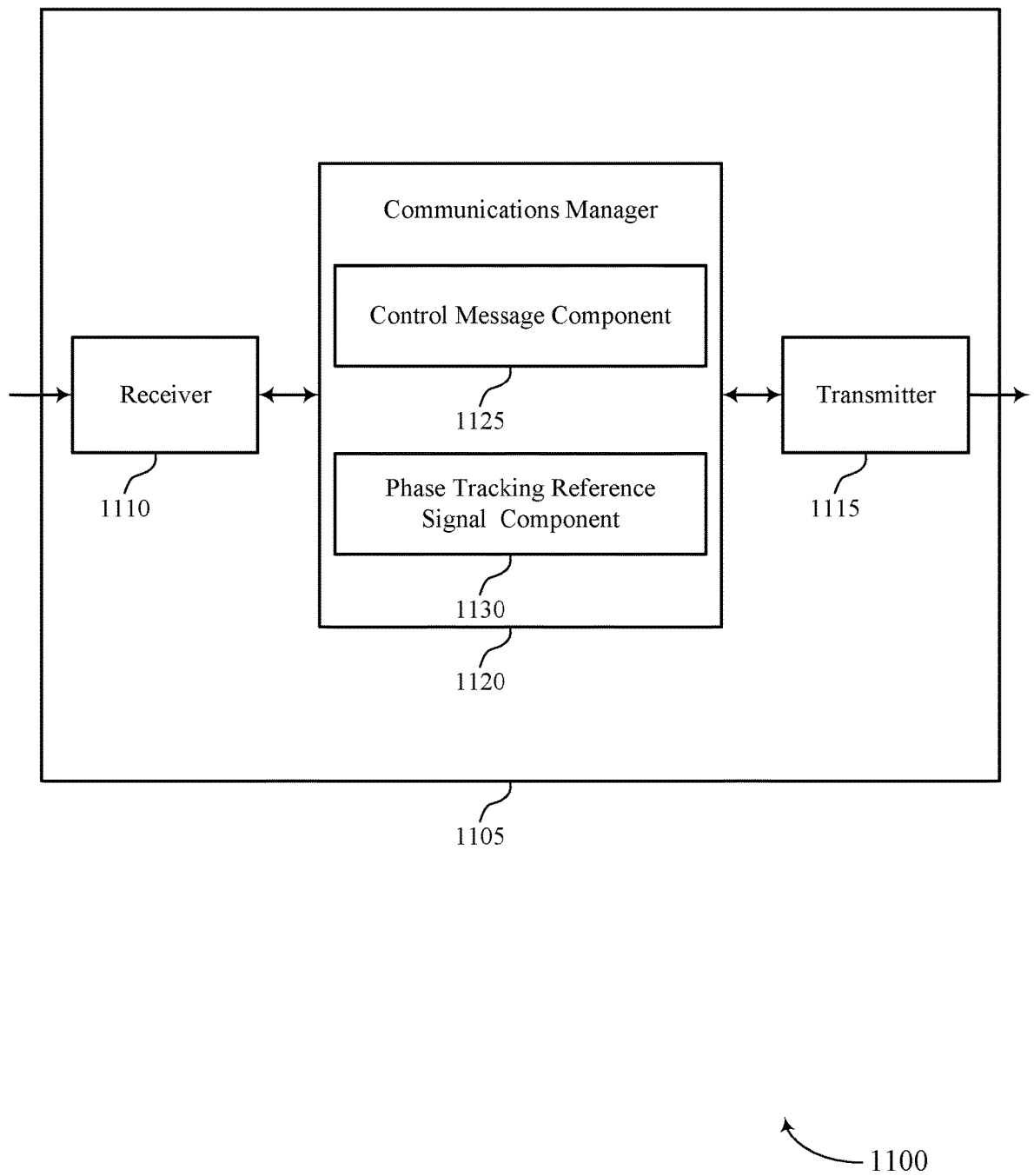

FIG. 11 shows a block diagram 1100 of a device 1105 that supports techniques for determining phase tracking reference signal location in accordance with various aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for determining phase tracking reference signal location). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for determining phase tracking reference signal location). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for determining phase tracking reference signal location as described herein. For example, the communications manager 1120 may include a control message component 1125 a phase tracking reference signal component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The control message component 1125 may be configured as or otherwise support a means for transmitting, to a UE, a control message including an indication of a reference signal configuration associated with one or more physical channels scheduled during a set of multiple time intervals. The phase tracking reference signal component 1130 may be configured as or otherwise support a means for receiving, from the UE and based on the control message, a phase tracking reference signal at a location in a first time interval of the set of multiple time intervals, where a demodulation reference signal is absent in the first time interval.

Figure 12:
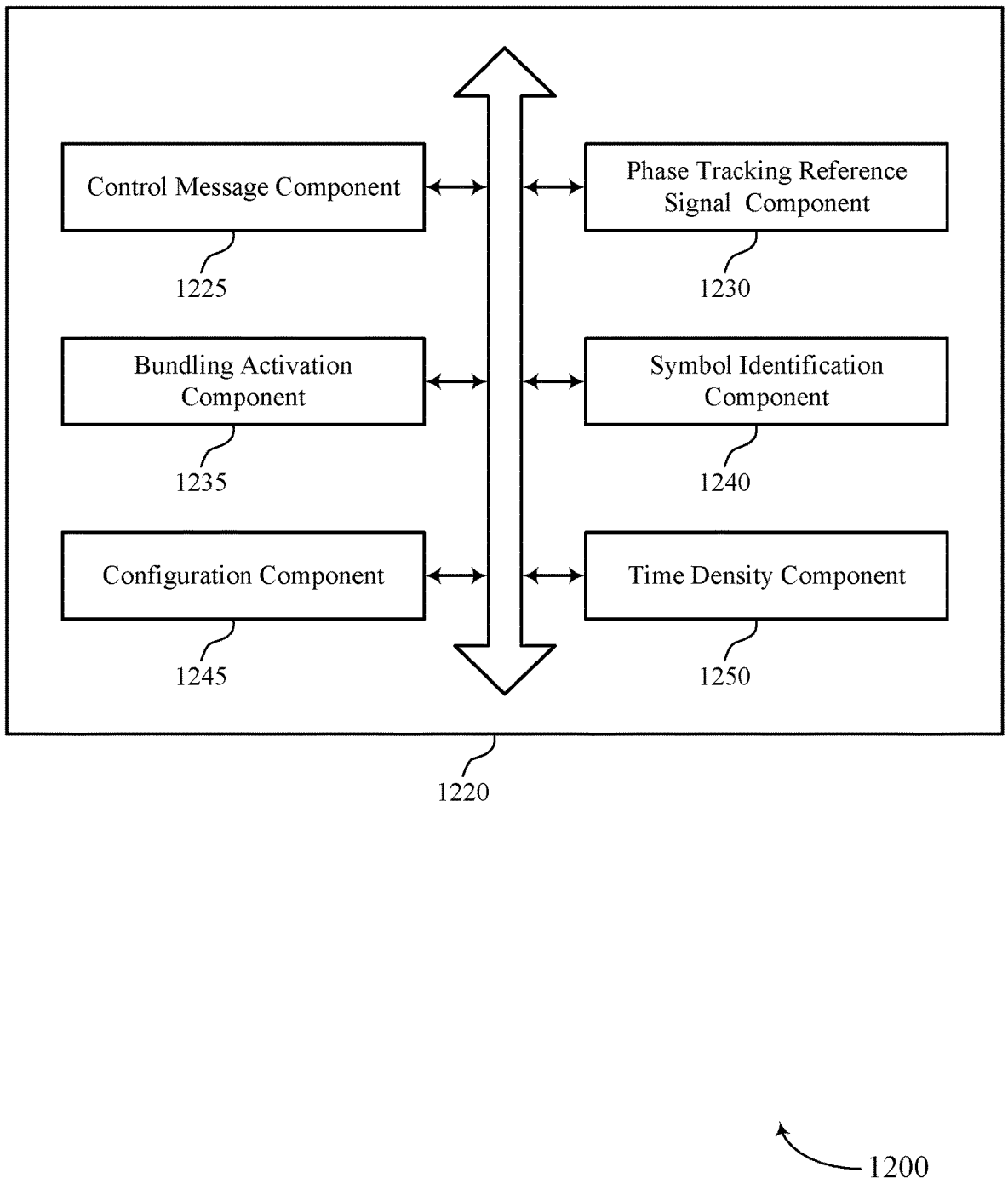
FIG. 12 shows a block diagram of a communications manager that supports techniques for determining phase tracking reference signal location in accordance with various aspects of the present disclosure.

FIG. 12 shows a block diagram 1200 of a communications manager 1220 that supports techniques for determining phase tracking reference signal location in accordance with various aspects of the present disclosure. The communications manager 1220 may be an example of aspects of a communications manager 1020, a communications manager 1120, or both, as described herein. The communications manager 1220, or various components thereof, may be an example of means for performing various aspects of techniques for determining phase tracking reference signal location as described herein. For example, the communications manager 1220 may include a control message component 1225, a phase tracking reference signal component 1230, a bundling activation component 1235, a symbol identification component 1240, a configuration component 1245, a time density component 1250, or any combination thereof. Each of these components may communicate, directly or indirectly, with one another (e.g., via one or more buses).

The communications manager 1220 may support wireless communication at a base station in accordance with examples as disclosed herein. The control message component 1225 may be configured as or otherwise support a means for transmitting, to a UE, a control message including an indication of a reference signal configuration associated with one or more physical channels scheduled during a set of multiple time intervals. The phase tracking reference signal component 1230 may be configured as or otherwise support a means for receiving, from the UE and based on the control message, a phase tracking reference signal at a location in a first time interval of the set of multiple time intervals, where a demodulation reference signal is absent in the first time interval.

In some examples, to support transmitting the control message, the bundling activation component 1235 may be configured as or otherwise support a means for transmitting the control message indicating that demodulation reference signal bundling is activated for the set of multiple time intervals, where a second time interval preceding the first time interval and a third time interval succeeding the first time interval include the demodulation reference signal.

In some examples, the control message component 1225 may be configured as or otherwise support a means for indicating a time domain resource allocation via the control message, where the location of the phase tracking reference signal in the first time interval includes a symbol at a beginning of the first time interval of the set of multiple time intervals.

In some examples, the symbol identification component 1240 may be configured as or otherwise support a means for identifying a first symbol within the first time interval of the set of multiple time intervals. In some examples, the configuration component 1245 may be configured as or otherwise support a means for configuring the UE to apply a shift in time to the first symbol to identify a second symbol within the first time interval, where the location of the phase tracking reference signal in the first time interval includes the second symbol within the first time interval.

In some examples, the location of the phase tracking reference signal in the first time interval is based on a location of a resource element including the demodulation reference signal in a second time interval preceding the first time interval of the set of multiple time intervals. In some examples, the location of the phase tracking reference signal in the first time interval is based on a location of a resource element associated with an eliminated demodulation reference signal in the first time interval of the set of multiple time intervals.

In some examples, the configuration component 1245 may be configured as or otherwise support a means for transmitting, to the UE, a configuration message including a first configuration and a second configuration for counting one or more symbols for transmitting the phase tracking reference signal.

In some examples, to support transmitting the control message, the control message component 1225 may be configured as or otherwise support a means for transmitting, to the UE, the control message selecting the first configuration or the second configuration for counting the one or more symbols for transmitting the phase tracking reference signal, where the location of the phase tracking reference signal is based on the selected configuration.

In some examples, the first configuration and the second configuration include a subset of a set of multiple configurations. In some examples, the time density component 1250 may be configured as or otherwise support a means for transmitting an RRC signal including a configuration for a set of multiple time densities associated with the phase tracking reference signal, where receiving the phase tracking reference signal includes receiving the phase tracking reference signal according to a time density from the set of multiple time densities identified based on the received configuration.

In some examples, to support receiving the phase tracking reference signal, the phase tracking reference signal component 1230 may be configured as or otherwise support a means for receiving the phase tracking reference signal on a first set of resource elements with a first time density and on a second set of resource elements with a second time density, the first time density being greater than the second time density. In some examples, the first set of resource elements is located at an edge of the first time interval.

Figure 13:
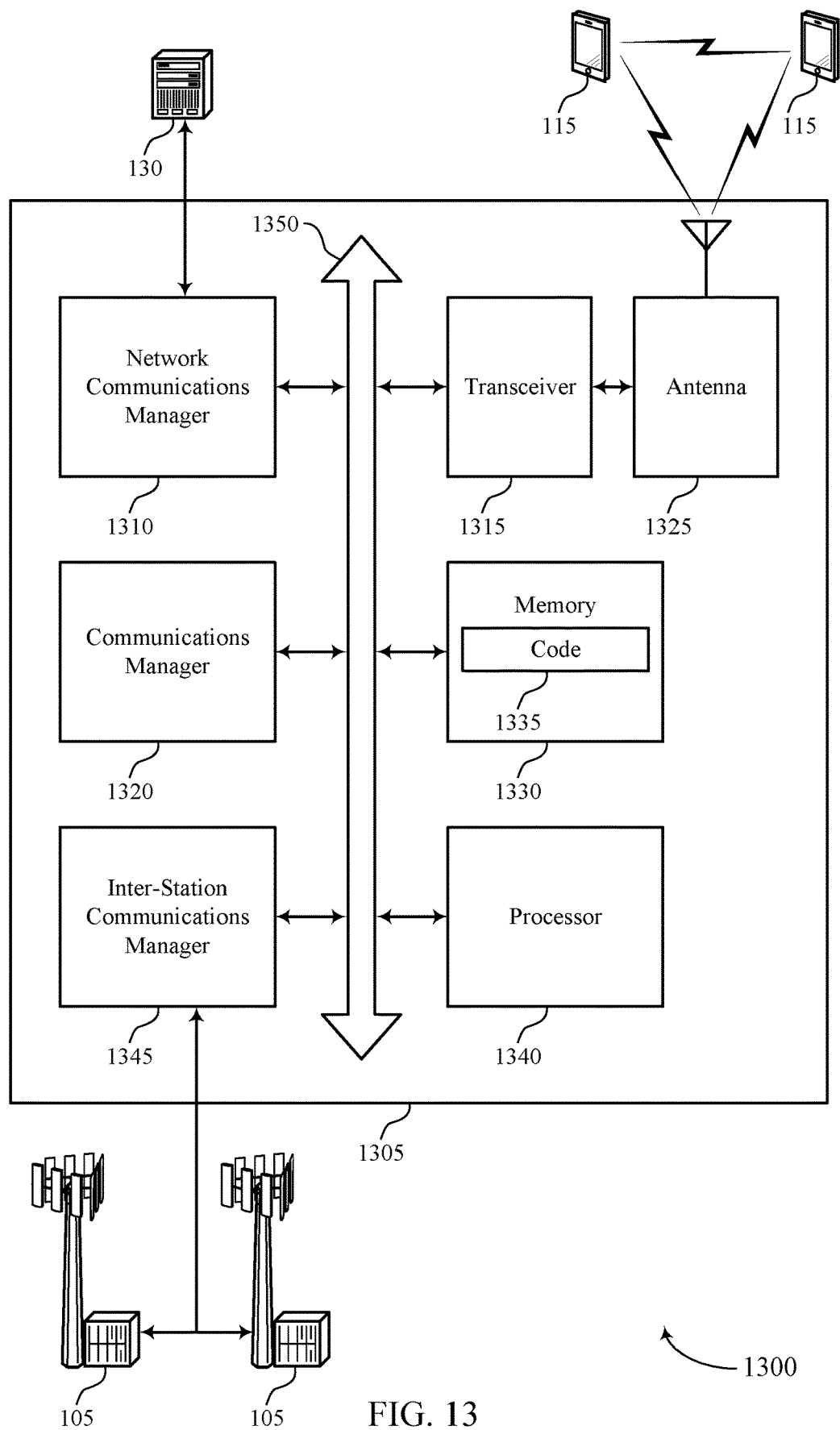
FIG. 13 shows a diagram of a system including a device that supports techniques for determining phase tracking reference signal location in accordance with various aspects of the present disclosure.

FIG. 13 shows a diagram of a system 1300 including a device 1305 that supports techniques for determining phase tracking reference signal location in accordance with various aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for determining phase tracking reference signal location). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, a control message including an indication of a reference signal configuration associated with one or more physical channels scheduled during a set of multiple time intervals. The communications manager 1320 may be configured as or otherwise support a means for receiving, from the UE and based on the control message, a phase tracking reference signal at a location in a first time interval of the set of multiple time intervals, where a demodulation reference signal is absent in the first time interval.

By including or configuring the communications manager 1320 in accordance with examples as described herein, the device 1305 may support techniques for improved communication reliability, reduced latency, improved user experience related to reduced processing, more efficient utilization of communication resources, and improved coordination between devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for determining phase tracking reference signal location as described herein, or the processor 1340 and the memory 1330 may be otherwise configured to perform or support such operations.

Figure 14:
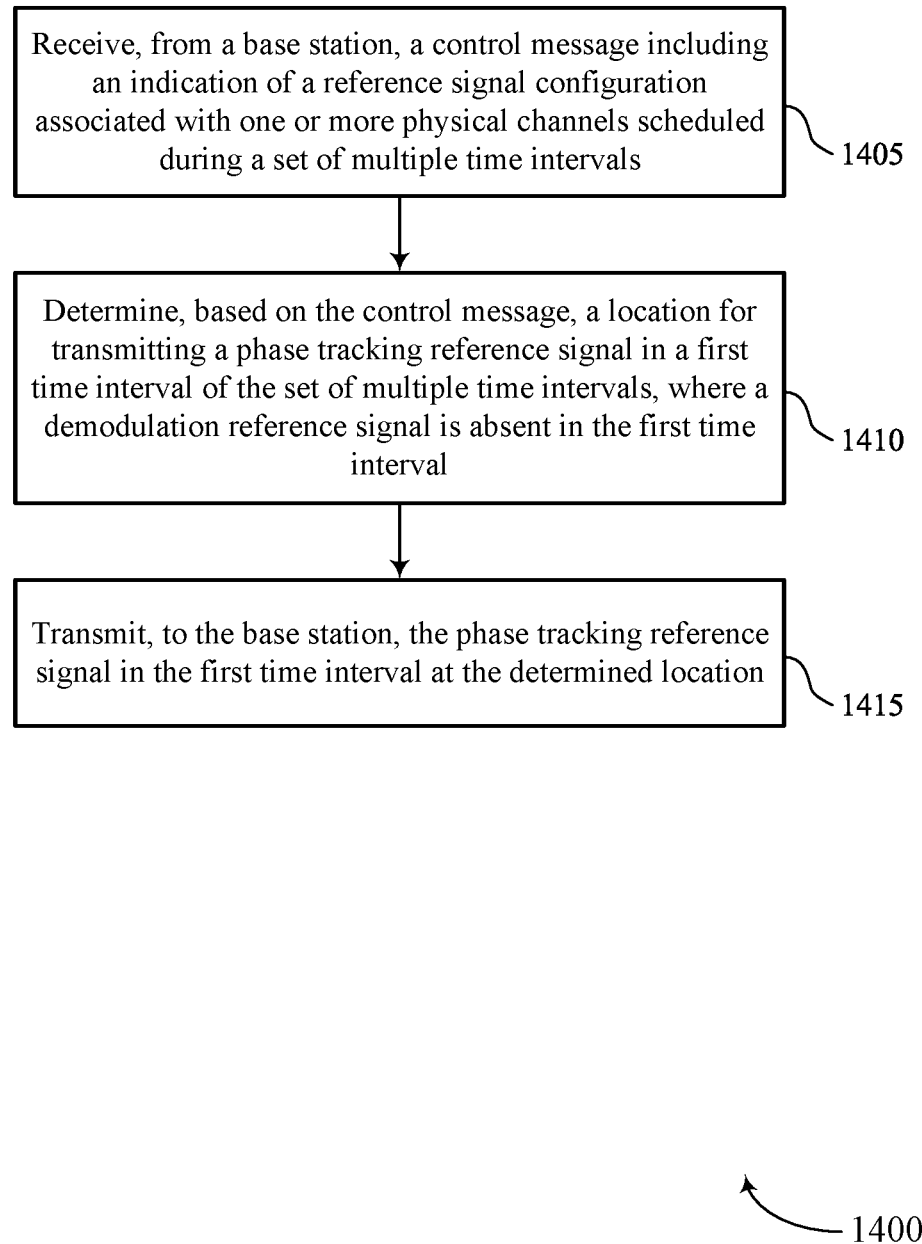
FIGS. 14 through 17 show flowcharts illustrating methods that support techniques for determining phase tracking reference signal location in accordance with various aspects of the present disclosure.

FIG. 14 shows a flowchart illustrating a method 1400 that supports techniques for determining phase tracking reference signal location in accordance with various aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a control message including an indication of a reference signal configuration associated with one or more physical channels scheduled during a set of multiple time intervals. The operations of 1405 may be performed in accordance with examples as disclosed herein. In some examples, aspects of the operations of 1405 may be performed by a control message component 825 as described with reference to FIG. 8.

At 1410, the method may include determining, based on the control message, a location for transmitting a phase tracking reference signal in a first time interval of the set of multiple time intervals, where a demodulation reference signal is absent in the first time interval. The operations of 1410 may be performed in accordance with examples as disclosed herein. In some examples, aspects of the operations of 1410 may be performed by a location determination component 830 as described with reference to FIG. 8.

At 1415, the method may include transmitting, to the base station, the phase tracking reference signal in the first time interval at the determined location. The operations of 1415 may be performed in accordance with examples as disclosed herein. In some examples, aspects of the operations of 1415 may be performed by a phase tracking reference signal transmission component 835 as described with reference to FIG. 8.

Figure 15:
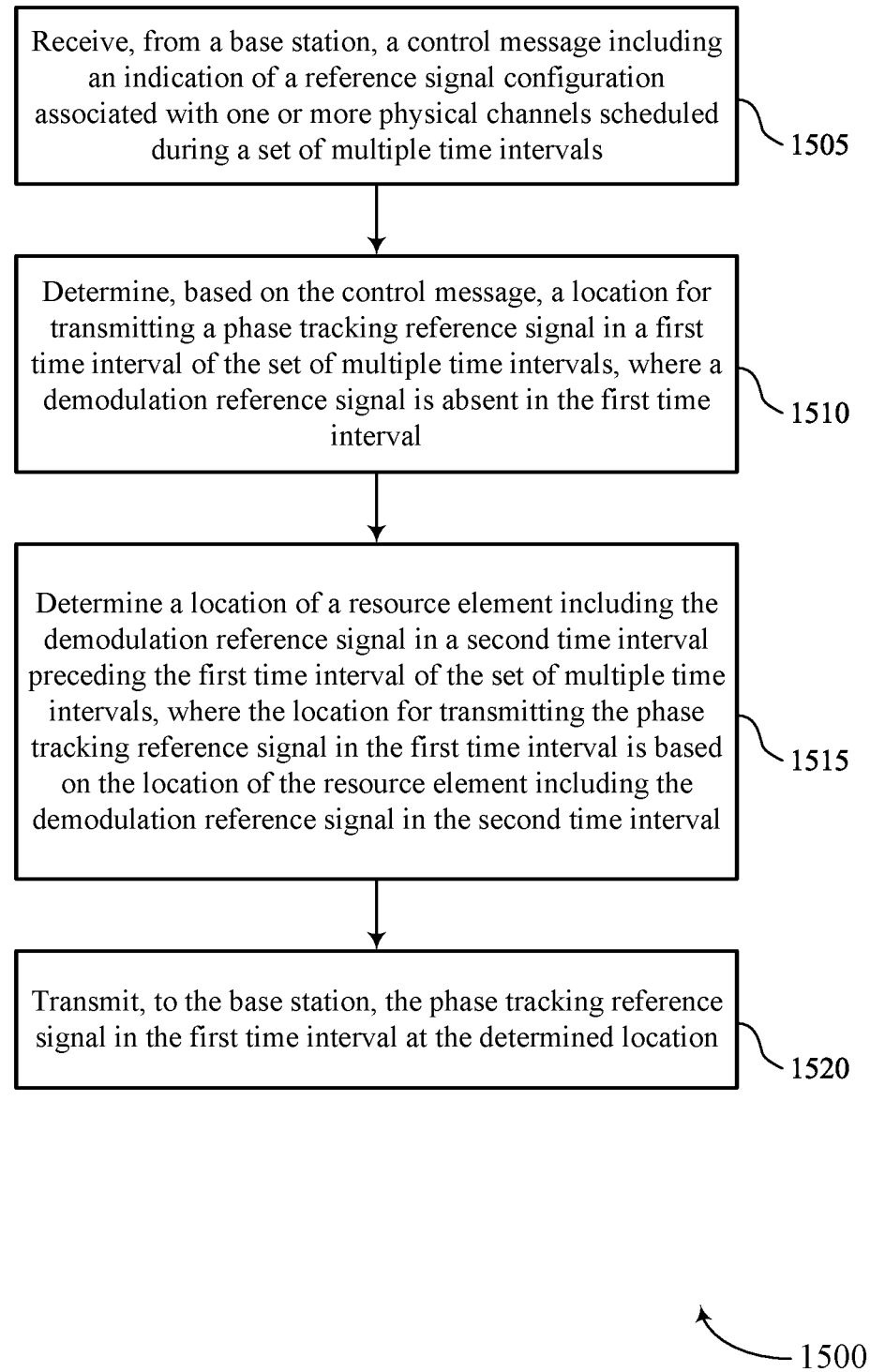

FIG. 15 shows a flowchart illustrating a method 1500 that supports techniques for determining phase tracking reference signal location in accordance with various aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a control message including an indication of a reference signal configuration associated with one or more physical channels scheduled during a set of multiple time intervals. The operations of 1505 may be performed in accordance with examples as disclosed herein. In some examples, aspects of the operations of 1505 may be performed by a control message component 825 as described with reference to FIG. 8.

At 1510, the method may include determining, based on the control message, a location for transmitting a phase tracking reference signal in a first time interval of the set of multiple time intervals, where a demodulation reference signal is absent in the first time interval. The operations of 1510 may be performed in accordance with examples as disclosed herein. In some examples, aspects of the operations of 1510 may be performed by a location determination component 830 as described with reference to FIG. 8.

At 1515, the method may include determining a location of a resource element including the demodulation reference signal in a second time interval preceding the first time interval of the set of multiple time intervals, where the location for transmitting the phase tracking reference signal in the first time interval is based on the location of the resource element including the demodulation reference signal in the second time interval. The operations of 1515 may be performed in accordance with examples as disclosed herein. In some examples, aspects of the operations of 1515 may be performed by a location determination component 830 as described with reference to FIG. 8.

At 1520, the method may include transmitting, to the base station, the phase tracking reference signal in the first time interval at the determined location. The operations of 1520 may be performed in accordance with examples as disclosed herein. In some examples, aspects of the operations of 1520 may be performed by a phase tracking reference signal transmission component 835 as described with reference to FIG. 8.

Figure 16:
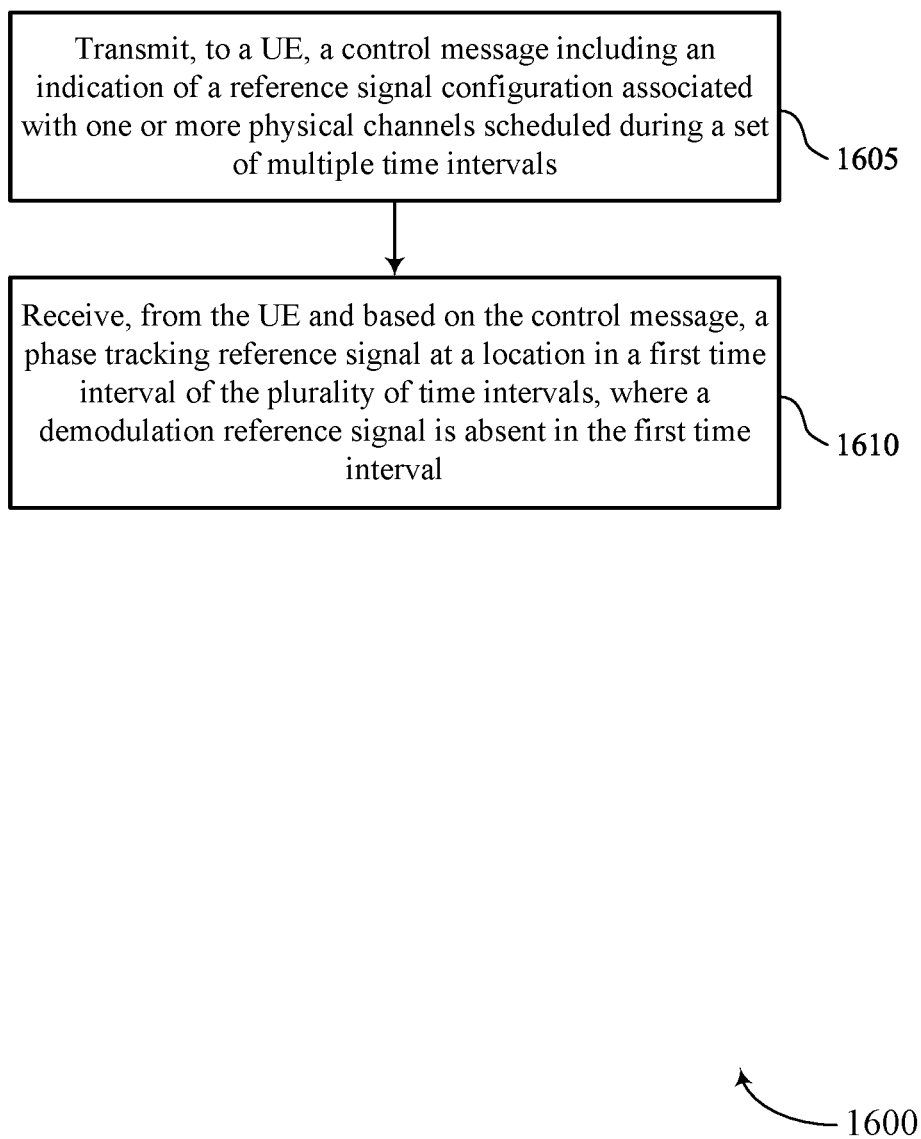

FIG. 16 shows a flowchart illustrating a method 1600 that supports techniques for determining phase tracking reference signal location in accordance with various aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a control message including an indication of a reference signal configuration associated with one or more physical channels scheduled during a set of multiple time intervals. The operations of 1605 may be performed in accordance with examples as disclosed herein. In some examples, aspects of the operations of 1605 may be performed by a control message component 1225 as described with reference to FIG. 12.

At 1610, the method may include receiving, from the UE and based on the control message, a phase tracking reference signal at a location in a first time interval of the set of multiple time intervals, where a demodulation reference signal is absent in the first time interval. The operations of 1610 may be performed in accordance with examples as disclosed herein. In some examples, aspects of the operations of 1610 may be performed by a phase tracking reference signal component 1230 as described with reference to FIG. 12.

Figure 17:
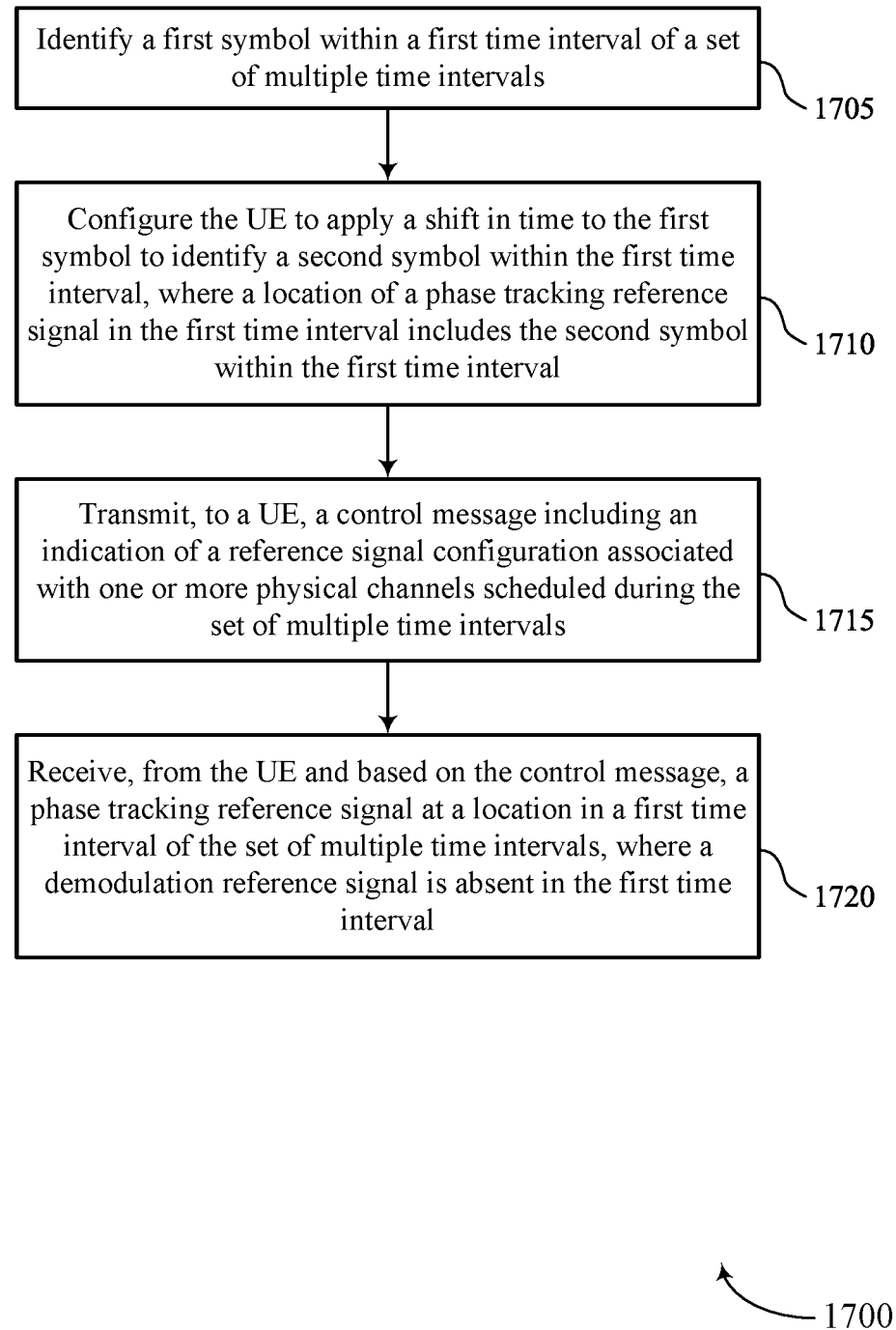

FIG. 17 shows a flowchart illustrating a method 1700 that supports techniques for determining phase tracking reference signal location in accordance with various aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include identifying a first symbol within the first time interval of the set of multiple time intervals. The operations of 1705 may be performed in accordance with examples as disclosed herein. In some examples, aspects of the operations of 1705 may be performed by a symbol identification component 1240 as described with reference to FIG. 12.

At 1710, the method may include configuring the UE to apply a shift in time to the first symbol to identify a second symbol within the first time interval, where the location of the phase tracking reference signal in the first time interval includes the second symbol within the first time interval. The operations of 1710 may be performed in accordance with examples as disclosed herein. In some examples, aspects of the operations of 1710 may be performed by a configuration component 1245 as described with reference to FIG. 12.

At 1715, the method may include transmitting, to a UE, a control message including an indication of a reference signal configuration associated with one or more physical channels scheduled during a set of multiple time intervals. The operations of 1715 may be performed in accordance with examples as disclosed herein. In some examples, aspects of the operations of 1715 may be performed by a control message component 1225 as described with reference to FIG. 12.

At 1720, the method may include receiving, from the UE and based on the control message, a phase tracking reference signal at a location in a first time interval of the set of multiple time intervals, where a demodulation reference signal is absent in the first time interval. The operations of 1720 may be performed in accordance with examples as disclosed herein. In some examples, aspects of the operations of 1720 may be performed by a phase tracking reference signal component 1230 as described with reference to FIG. 12.

The following provides an overview of aspects of the present disclosure:

Aspect 1: A method for wireless communication at a UE, comprising: receiving, from a base station, a control message comprising an indication of a reference signal configuration associated with one or more physical channels scheduled during a plurality of time intervals; determining, based at least in part on the control message, a location for transmitting a phase tracking reference signal in a first time interval of the plurality of time intervals, wherein a demodulation reference signal is absent in the first time interval; transmitting, to the base station, the phase tracking reference signal in the first time interval at the determined location.

Aspect 2: The method of aspect 1, further comprising: identifying that the control message indicates that demodulation reference signal bundling is activated for the plurality of time intervals, wherein a second time interval preceding the first time interval and a third time interval succeeding the first time interval comprise the demodulation reference signal.

Aspect 3: The method of any of aspects 1 through 2, further comprising: identifying a time domain resource allocation indicated via the control message; and identifying a symbol at a beginning of the first time interval of the plurality of time intervals based at least in part on the time domain resource allocation, wherein the location for transmitting the phase tracking reference signal in the first time interval comprises the symbol at the beginning of the first time interval.

Aspect 4: The method of any of aspects 1 through 3, further comprising: identifying a first symbol within the first time interval of the plurality of time intervals; and applying a shift in time to the first symbol to identify a second symbol within the first time interval, wherein the location for transmitting the phase tracking reference signal in the first time interval comprises the second symbol within the first time interval.

Aspect 5: The method of any of aspects 1 through 4, wherein determining the location for transmitting the phase tracking reference signal in the first time interval comprises: determining a location of a resource element comprising the demodulation reference signal in a second time interval preceding the first time interval of the plurality of time intervals, wherein the location for transmitting the phase tracking reference signal in the first time interval is based at least in part on the location of the resource element comprising the demodulation reference signal in the second time interval.

Aspect 6: The method of any of aspects 1 through 5, wherein determining the location for transmitting the phase tracking reference signal in the first time interval comprises: determining a location of a resource element associated with an eliminated demodulation reference signal in the first time interval of the plurality of time intervals, wherein the location for transmitting the phase tracking reference signal in the first time interval is based at least in part on the location of the resource element associated with the eliminated demodulation reference signal.

Aspect 7: The method of any of aspects 1 through 6, further comprising: receiving, from the base station, a configuration message comprising a first configuration and a second configuration for counting one or more symbols for transmitting the phase tracking reference signal.

Aspect 8: The method of aspect 7, wherein receiving the control message comprises: receiving, from the base station, the control message selecting the first configuration or the second configuration for counting the one or more symbols for transmitting the phase tracking reference signal, wherein the location for transmitting the phase tracking reference signal is based at least in part on the selected configuration.

Aspect 9: The method of any of aspects 7 through 8, wherein the first configuration and the second configuration comprise a subset of a plurality of configurations.

Aspect 10: The method of any of aspects 1 through 9, further comprising: receiving a radio resource control signal comprising a configuration for a plurality of time densities associated with the phase tracking reference signal; and identifying a time density from the plurality of time densities based at least in part on the received configuration, wherein transmitting the phase tracking reference signal comprises transmitting the phase tracking reference signal according to the identified time density.

Aspect 11: The method of any of aspects 1 through 10, wherein transmitting the phase tracking reference signal comprises: transmitting the phase tracking reference signal on a first set of resource elements with a first time density and on a second set of resource elements with a second time density, the first time density being greater than the second time density.

Aspect 12: The method of aspect 11, wherein the first set of resource elements is located at an edge of the first time interval.

Aspect 13: The method of any of aspects 1 through 12, wherein the control message comprises a downlink control indicator.

Aspect 14: The method of any of aspects 1 through 13, wherein the one or more physical channels comprise a physical uplink shared channel or a physical downlink shared channel or both.

Aspect 15: A method for wireless communication at a base station, comprising: transmitting, to a UE, a control message comprising an indication of a reference signal configuration associated with one or more physical channels scheduled during a plurality of time intervals; and receiving, from the UE and based at least in part on the control message, a phase tracking reference signal at a location in a first time interval of the plurality of time intervals, wherein a demodulation reference signal is absent in the first time interval.

Aspect 16: The method of aspect 15, wherein transmitting the control message comprises: transmitting the control message indicating that demodulation reference signal bundling is activated for the plurality of time intervals, wherein a second time interval preceding the first time interval and a third time interval succeeding the first time interval comprise the demodulation reference signal.

Aspect 17: The method of any of aspects 15 through 16, further comprising: indicating a time domain resource allocation via the control message, wherein the location of the phase tracking reference signal in the first time interval comprises a symbol at a beginning of the first time interval of the plurality of time intervals.

Aspect 18: The method of any of aspects 15 through 17, further comprising: identifying a first symbol within the first time interval of the plurality of time intervals; and configuring the UE to apply a shift in time to the first symbol to identify a second symbol within the first time interval, wherein the location of the phase tracking reference signal in the first time interval comprises the second symbol within the first time interval.

Aspect 19: The method of any of aspects 15 through 18, wherein the location of the phase tracking reference signal in the first time interval is based at least in part on a location of a resource element comprising the demodulation reference signal in a second time interval preceding the first time interval of the plurality of time intervals.

Aspect 20: The method of any of aspects 15 through 19, wherein the location of the phase tracking reference signal in the first time interval is based at least in part on a location of a resource element associated with an eliminated demodulation reference signal in the first time interval of the plurality of time intervals.

Aspect 21: The method of any of aspects 15 through 20, further comprising: transmitting, to the UE, a configuration message comprising a first configuration and a second configuration for counting one or more symbols for transmitting the phase tracking reference signal.

Aspect 22: The method of aspect 21, wherein transmitting the control message comprises: transmitting, to the UE, the control message selecting the first configuration or the second configuration for counting the one or more symbols for transmitting the phase tracking reference signal, wherein the location of the phase tracking reference signal is based at least in part on the selected configuration.

Aspect 23: The method of any of aspects 21 through 22, wherein the first configuration and the second configuration comprise a subset of a plurality of configurations.

Aspect 24: The method of any of aspects 15 through 23, further comprising: transmitting a radio resource control signal comprising a configuration for a plurality of time densities associated with the phase tracking reference signal, wherein receiving the phase tracking reference signal comprises receiving the phase tracking reference signal according to a time density from the plurality of time densities identified based at least in part on the received configuration.

Aspect 25: The method of any of aspects 15 through 24, wherein receiving the phase tracking reference signal comprises: receiving the phase tracking reference signal on a first set of resource elements with a first time density and on a second set of resource elements with a second time density, the first time density being greater than the second time density.

Aspect 26: The method of aspect 25, wherein the first set of resource elements is located at an edge of the first time interval.

Aspect 27: An apparatus for wireless communication at a UE, comprising a processor; memory coupled with the processor; and instructions stored in the memory and executable by the processor to cause the apparatus to perform a method of any of aspects 1 through 14.

Aspect 28: An apparatus for wireless communication at a UE, comprising at least one means for performing a method of any of aspects 1 through 14.

Aspect 29: A non-transitory computer-readable medium storing code for wireless communication at a UE, the code comprising instructions executable by a processor to perform a method of any of aspects 1 through 14.

Aspect 30: An apparatus for wireless communication at a base station, comprising a processor; memory coupled with the processor; and instructions stored in the memory and executable by the processor to cause the apparatus to perform a method of any of aspects 15 through 26.

Aspect 31: An apparatus for wireless communication at a base station, comprising at least one means for performing a method of any of aspects 15 through 26.

Aspect 32: A non-transitory computer-readable medium storing code for wireless communication at a base station, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the present disclosure may be applicable to various other wireless communications systems such as Ultra Mobile Broadband (UMB), IEEE 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the present disclosure. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network device, a control message comprising an indication of a reference signal configuration associated with one or more physical channels scheduled during a plurality of time slots;
   determining, based at least in part on the control message and an absence of a demodulation reference signal in a first time slot of the plurality of time slots, a location for transmitting a phase tracking reference signal in the first time slot, the first time slot comprising a plurality of resource elements; and
   transmitting, to the network device, the phase tracking reference signal in the first time slot at the determined location.

2. The method of claim 1, further comprising:
   identifying that the control message indicates that demodulation reference signal bundling is activated for the plurality of time slots, wherein a second time slot preceding the first time slot and a third time slot succeeding the first time slot comprise the demodulation reference signal.

3. The method of claim 1, further comprising:
   identifying a time domain resource allocation indicated via the control message; and
   identifying a symbol at a beginning of the first time slot of the plurality of time slots based at least in part on the time domain resource allocation, wherein the location for transmitting the phase tracking reference signal in the first time slot comprises the symbol at the beginning of the first time slot based at least in part on the absence of the demodulation reference signal in the first time slot.

4. The method of claim 1, further comprising:
   identifying a first symbol within the first time slot of the plurality of time slots; and
   applying a shift in time to the first symbol to identify a second symbol within the first time slot, wherein the location for transmitting the phase tracking reference signal in the first time slot comprises the second symbol within the first time slot based at least in part on the absence of the demodulation reference signal in the first time slot.

5. The method of claim 1, wherein determining the location for transmitting the phase tracking reference signal in the first time slot comprises:
determining a location of a resource element comprising the demodulation reference signal in a second time slot preceding the first time slot of the plurality of time slots, wherein the location for transmitting the phase tracking reference signal in the first time slot is based at least in part on the location of the resource element comprising the demodulation reference signal in the second time slot and the absence of the demodulation reference signal in the first time slot.

6. The method of claim 1, wherein determining the location for transmitting the phase tracking reference signal in the first time slot comprises:
determining a location of a resource element associated with an eliminated demodulation reference signal in the first time slot of the plurality of time slots, wherein the location for transmitting the phase tracking reference signal in the first time slot is based at least in part on the location of the resource element associated with the eliminated demodulation reference signal.

7. The method of claim 1, further comprising:
receiving, from the network device, a configuration message comprising a first configuration and a second configuration for counting one or more symbols for transmitting the phase tracking reference signal.

8. The method of claim 7, wherein receiving the control message comprises:
receiving, from the network device, the control message selecting the first configuration or the second configuration for counting the one or more symbols for transmitting the phase tracking reference signal, wherein the location for transmitting the phase tracking reference signal is based at least in part on the selected configuration.

9. The method of claim 7, wherein the first configuration and the second configuration comprise a subset of a plurality of configurations.

10. The method of claim 1, further comprising:
receiving a radio resource control signal comprising a configuration for a plurality of time densities associated with the phase tracking reference signal; and
identifying a time density from the plurality of time densities based at least in part on the received configuration, wherein transmitting the phase tracking reference signal comprises transmitting the phase tracking reference signal according to the identified time density.

11. The method of claim 1, wherein transmitting the phase tracking reference signal comprises:
transmitting the phase tracking reference signal on a first set of resource elements with a first time density and on a second set of resource elements with a second time density, the first time density being greater than the second time density.

12. The method of claim 11, wherein the first set of resource elements is located at an edge of the first time slot.

13. The method of claim 1, wherein the control message comprises a downlink control indicator.

14. The method of claim 1, wherein the one or more physical channels comprise a physical uplink shared channel or a physical downlink shared channel or both.

15. A method for wireless communication at a network device, comprising:
transmitting, to a user equipment (UE), a control message comprising an indication of a reference signal configuration associated with one or more physical channels scheduled during a plurality of time slots; and
receiving, from the UE and based at least in part on the control message and an absence of a demodulation reference signal in a first time slot of the plurality of time slots, a phase tracking reference signal at a location in the first time slot, the first time slot comprising a plurality of resource elements.

16. The method of claim 15, wherein transmitting the control message comprises:
transmitting the control message indicating that demodulation reference signal bundling is activated for the plurality of time slots, wherein a second time slot preceding the first time slot and a third time slot succeeding the first time slot comprise the demodulation reference signal.

17. The method of claim 15, further comprising:
indicating a time domain resource allocation via the control message, wherein the location of the phase tracking reference signal in the first time slot comprises a symbol at a beginning of the first time slot of the plurality of time slots based at least in part on the absence of the demodulation reference signal in the first time slot.

18. The method of claim 15, further comprising:
identifying a first symbol within the first time slot of the plurality of time slots; and
configuring the UE to apply a shift in time to the first symbol to identify a second symbol within the first time slot, wherein the location of the phase tracking reference signal in the first time slot comprises the second symbol within the first time slot based at least in part on the absence of the demodulation reference signal in the first time slot.

19. The method of claim 15, wherein the location of the phase tracking reference signal in the first time slot is based at least in part on a location of a resource element comprising the demodulation reference signal in a second time slot preceding the first time slot of the plurality of time slots.

20. The method of claim 15, wherein the location of the phase tracking reference signal in the first time slot is based at least in part on a location of a resource element associated with an eliminated demodulation reference signal in the first time slot of the plurality of time slots.

21. The method of claim 15, further comprising:
transmitting, to the UE, a configuration message comprising a first configuration and a second configuration for counting one or more symbols for transmitting the phase tracking reference signal.

22. The method of claim 21, wherein transmitting the control message comprises:
transmitting, to the UE, the control message selecting the first configuration or the second configuration for counting the one or more symbols for transmitting the phase tracking reference signal, wherein the location of the phase tracking reference signal is based at least in part on the selected configuration.

23. The method of claim 21, wherein the first configuration and the second configuration comprise a subset of a plurality of configurations.

24. The method of claim 15, further comprising:
transmitting a radio resource control signal comprising a configuration for a plurality of time densities associated with the phase tracking reference signal, wherein receiving the phase tracking reference signal comprises receiving the phase tracking reference signal according to a time density from the plurality of time densities identified based at least in part on the received configuration.

25. The method of claim 15, wherein receiving the phase tracking reference signal comprises:
receiving the phase tracking reference signal on a first set of resource elements with a first time density and on a second set of resource elements with a second time density, the first time density being greater than the second time density.

26. The method of claim 25, wherein the first set of resource elements is located at an edge of the first time slot.

27. An apparatus for wireless communication at a user equipment (UE), comprising:
a processor;
memory coupled with the processor; and
instructions stored in the memory and executable by the processor to cause the apparatus to:
receive, from a network device, a control message comprising an indication of a reference signal configuration associated with one or more physical channels scheduled during a plurality of time slots;
determine, based at least in part on the control message and an absence of a demodulation reference signal in a first time slot of the plurality of time slots, a location for transmitting a phase tracking reference signal in the first time slot, the first time slot comprising a plurality of resource elements; and
transmit, to the network device, the phase tracking reference signal in the first time slot at the determined location.

28. The apparatus of claim 27, wherein the instructions are further executable by the processor to cause the apparatus to:
identify that the control message indicates that demodulation reference signal bundling is activated for the plurality of time slots, wherein a second time slot preceding the first time slot and a third time slot succeeding the first time slot comprise the demodulation reference signal.

29. The apparatus of claim 27, wherein the instructions are further executable by the processor to cause the apparatus to:
identify a time domain resource allocation indicated via the control message; and
identify a symbol at a beginning of the first time slot of the plurality of time slots based at least in part on the time domain resource allocation, wherein the location for transmitting the phase tracking reference signal in the first time slot comprises the symbol at the beginning of the first time slot based at least in part on the absence of the demodulation reference signal in the first time slot.

30. An apparatus for wireless communication at a network device, comprising:
a processor;
memory coupled with the processor; and
instructions stored in the memory and executable by the processor to cause the apparatus to:
transmit, to a user equipment (UE), a control message comprising an indication of a reference signal configuration associated with one or more physical channels scheduled during a plurality of time slots; and
receive, from the UE and based at least in part on the control message and an absence of a demodulation reference signal in a first time slot of the plurality of time slots, a phase tracking reference signal at a location in the first time slot of the plurality of time slots, the first time slot comprising a plurality of resource elements.

* * * * *